United States Patent
Williams, Jr.

(10) Patent No.: US 7,634,869 B1
(45) Date of Patent: Dec. 22, 2009

(54) COMBINED INTERCROPPING AND MULCHING METHOD

(76) Inventor: Marvin J. Williams, Jr., 1411 Bell Ave., New Buffalo, MI (US) 49117

( * ) Notice: Subject to any disclaimer, the term of this patent is extended or adjusted under 35 U.S.C. 154(b) by 1075 days.

(21) Appl. No.: 10/747,728

(22) Filed: Dec. 29, 2003

Related U.S. Application Data

(63) Continuation-in-part of application No. 10/683,889, filed on Oct. 10, 2003, now abandoned, which is a continuation-in-part of application No. 09/752,956, filed on Jan. 2, 2001, now Pat. No. 6,631,585.

(51) Int. Cl.
*A01G 1/00* (2006.01)
(52) U.S. Cl. ............................. 47/58.1 R; 47/58.1 SC; 47/58.1 SE; 111/100
(58) Field of Classification Search ............ 47/58.1 SC, 47/58.1 SE, 58.1 R; 111/200
See application file for complete search history.

(56) References Cited

U.S. PATENT DOCUMENTS 6,631,585 B1 * 10/2003 Williams, Jr. ............ 47/58.1 R

OTHER PUBLICATIONS

Iragavarapu et al. 1996. Border effects on yields in a strip-intercropped soybean, corn, and wheat production system. Journal of Production Agricultural 9: 101-107.*

Lu et al. 1999. Economic analysis fo sustainable agricultural cropping systems for Mid-Atlantic states. Journal of Sustainable Agriculture 15: 77-93.*
Ghaffarzadeh. 1997. Economic and biological benefits of intercropping berseem clover with oat in corn-soybean-oat rotations. Journal of Production Agricultural 10: 314-319.*
Waman. 1991. Effect of incorporated green manure crops on subsequent oat production in an acid, infertile silt loam. Dev. Plant Soil Science 45: 431-435.*
Tonhasca et al. 1991. Effects of strip intercropping and no-tillage on some pests and beneficial invertebrates of corm in Ohio. Environmental Entomology 20: 1251-1258.*
Quik-Change Attachments, brochure page.
KINZE[R] planter, brochure page.
Kuhn Cultirotor/Cultiplow,Cultitiller,EL201 catalogue.
Kuhn Power Riller/Cultiplow/Cultitiller EL 100N, catalogue.
DuPont Corn and Soybean Solutions Guide, booklet.

* cited by examiner

*Primary Examiner*—Andrea M Valenti
(74) *Attorney, Agent, or Firm*—Adrienne B. Naumann

(57) ABSTRACT

A method of combined intercropping and mulching of commercial crops is described herein. Suitable annuals such as young wheat and/or buckwheat plants are planted in soil in which legumes were originally planted. A portion of the resulting upper portions of young wheat and/or buckwheat plants is mowed and blended with organic debris to provide nutrients for intercropped commercial plants such as corn and soybeans. The remaining portion is chopped blended with organic debris and sprayed onto the top layer of seeded soil as combination mulch. For larger commercial applications, conventional agricultural machines are described herein, and are modified for the most efficient intercropping. For best results, at least one intercropped commercial plant should be a legume.

20 Claims, 24 Drawing Sheets

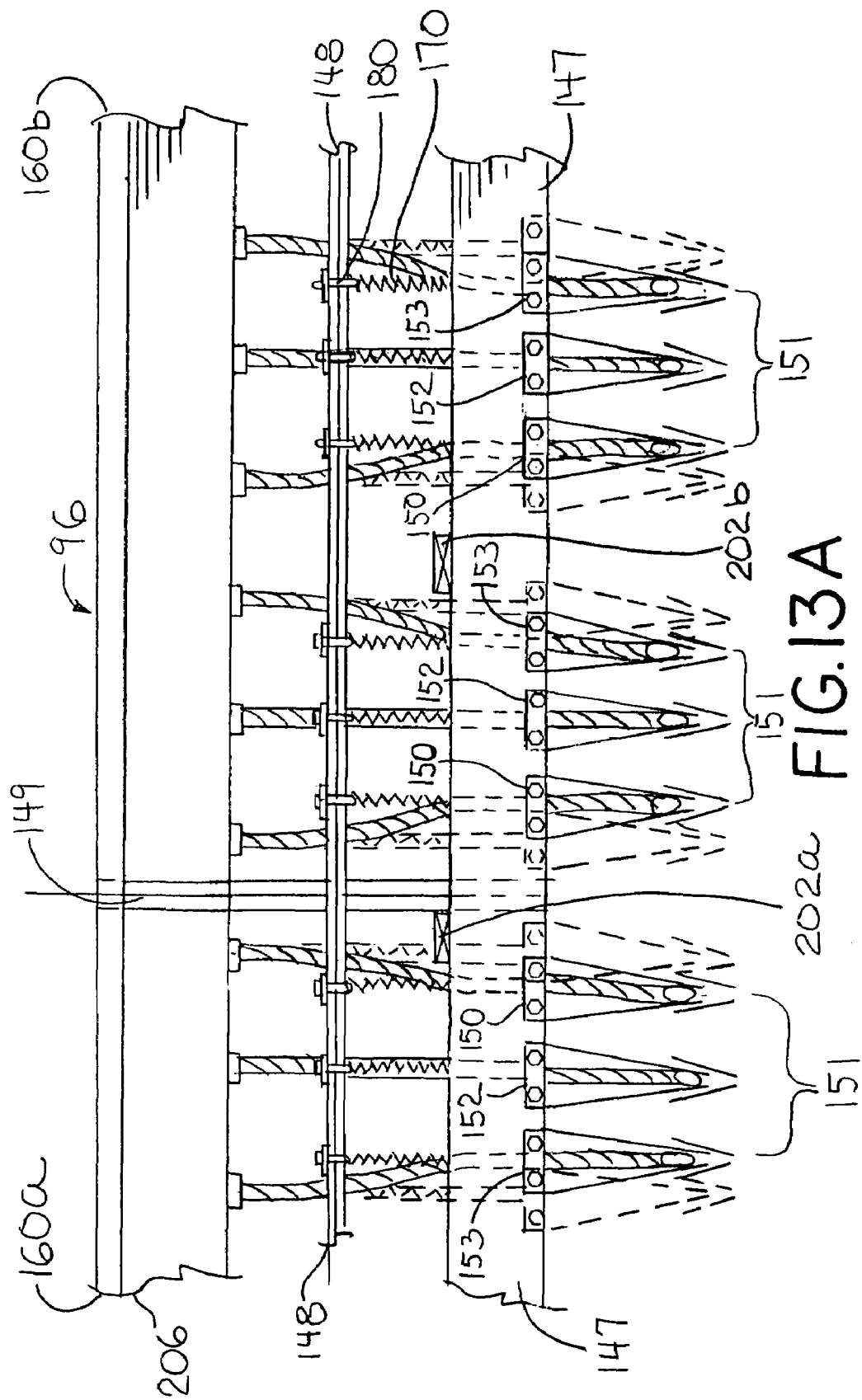

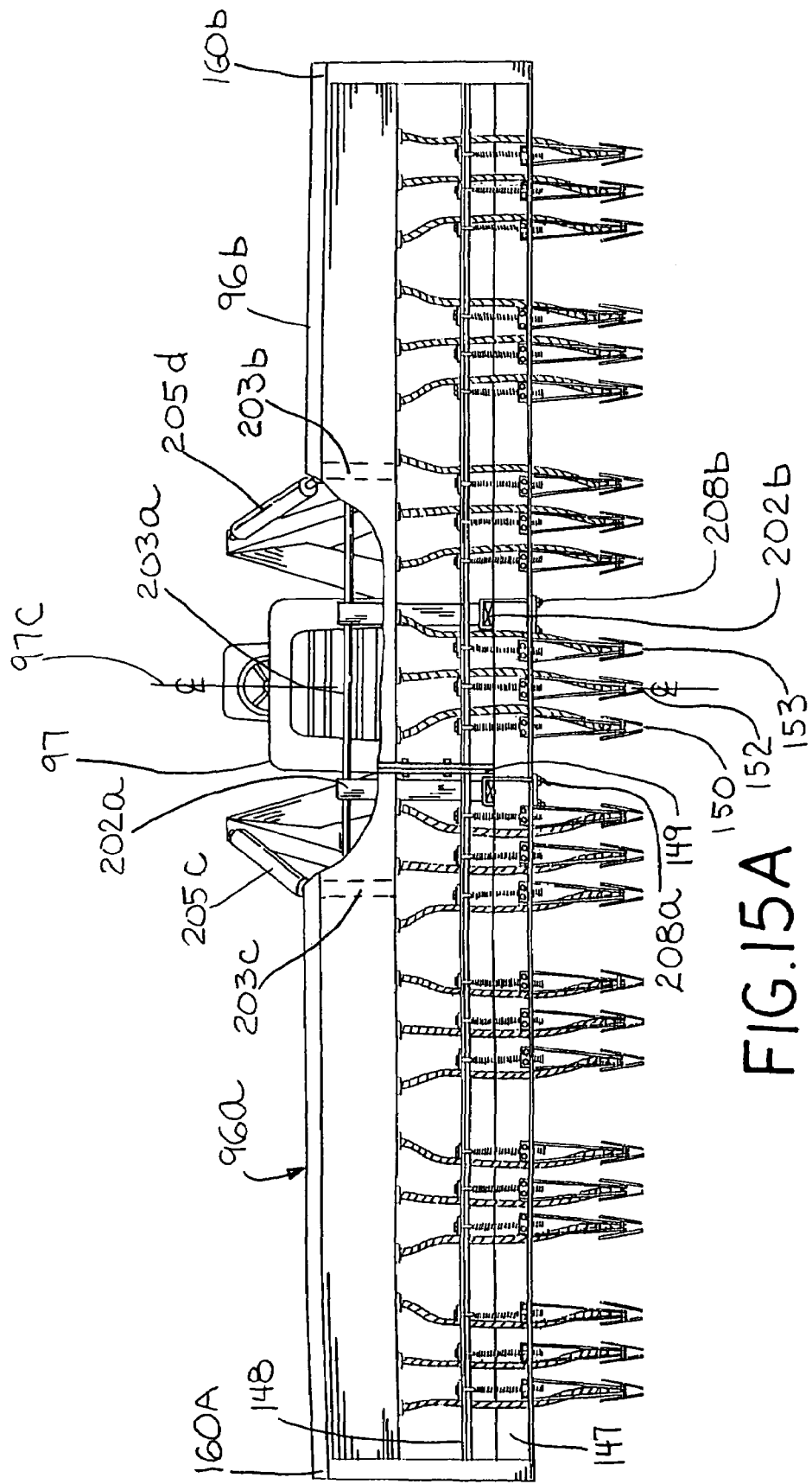

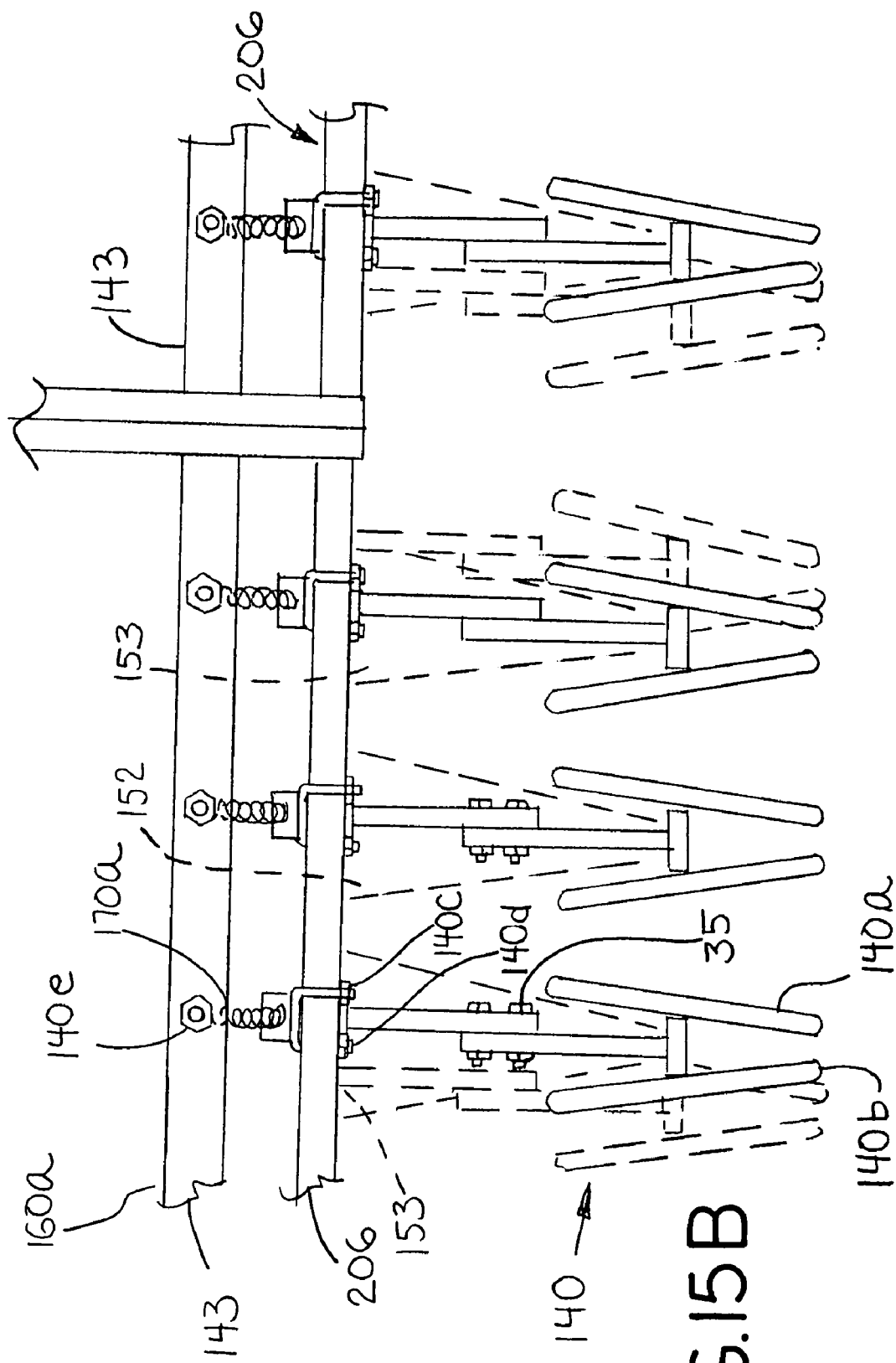

though Koch did not emphasize the beneficial ecological effects of combined intercropping and mulching as discussed in my invention.

COMBINED INTERCROPPING AND MULCHING METHOD

This application is a continuation in part of U.S. patent application Ser. No. 10/683,889 filed on Oct. 10, 2003 now abandoned which is a continuation in part of U.S. patent application Ser. No. 09/752,956 filed on Jan. 2, 2001, now U.S. Pat. No. 6,631,585 B1.

BACKGROUND OF THE INVENTION

This application is a continuation in part of U.S. utility patent application Ser. No. 10/683,889 which is a continuation in part of U.S. utility patent application Ser. No. 09/752,956.

My invention generally relates to combined intercropping of, and application of mulch to, commercial field crops. More particularly, my invention is a process in which annuals are planted in the fall to provide a green manure the following spring to intercropped commercial crops. My invention is intended for planters, farmers and gardeners of all specialties, and to all kinds, sizes and complexities of farming enterprises.

'Intercropping' is generally defined as the planting of a fast growing crop between alternating rows of a slow growing crop. My new method incorporates the commercially successful tillage system of the United States, particularly in the midwestern and prairie states. My method also incorporates the beneficial ecological effect of growing a commercial annual legume with corn, as well as incorporation of an annual green manure crop such as wheat and buckwheat.

My preferred method of intercropping comprises strip cropping corn and soybeans with subsequent application of green manure to the soil, and a layer of mulch upon the topsoil surface. My method does not require pesticides, herbicides or artificial fertilizers for healthy crops, nor to obtain an effective ground cover and subsoil root network with an effective moisture canopy and windbreak.

Moreover, my invention provides a kindlier developmental period for both soybean and corn seedlings through its micro-climate effect. Annual green manure plants such as buckwheat remain uncut until tillage and seeding of the commercial crop in early spring. Green manure provides nutrients for a seedling commercial spring crop, as well as a welcome mulch ground cover during the early growing season. My treated soil also accumulates soil nutrients with yearly use, thereby increasing land productivity. Tilling soil more than once a year may expose soil to air and decreases nutrients and fallow soil. As a result, tilling soil and leaving it without a mulch covering is discouraged.

Green manure plants combined with organic residue from deceased crops contains desiccated soybean roots and nitrogen nodules which remain intact in the soil. During the winter months, the intact root systems of these nonviable soybean and corn (and viable wheat) also function as ground cover and subsoil root retention system. In this manner, intact soybean and corn roots provide a physical soil network for the no till planting of a green manure crop (for example wheat and buckwheat grass) in the fall or early spring as the case may be. For example, wheat and buckwheat are planted in the fall or early spring, and are subsequently tilled into the soil as green manure while green and viable.

The farmer synchronizes planting (seeding) of the intercropped commercial plants with tilling the green manure plants into the soil. My process also provides: a reliable source of soluble nitrogenous and phosphorus compounds in the soil, additional humus and retention of soil, and an economical growth with cutting of green manure for a mulch covering.

U.S. Pat. No. 6,331,585 B1 (Williams) discloses an intercropping method in which soybeans are seeded within corn in an alternating predetermined pattern over an entire field. This method is adjustable to other crop and legume combinations, as well as larger commercial sized operations and small home gardens and fields. For best results the corn and soybeans are seeded at the same time in early May. The corn and soybeans subsequently create a micro-climate of humidity, as well as a comprehensive root system and ground cover. These features ameliorate drought and erosion during the entire year. Another advantage is use of conservation tillage which augments ecological long term advantages of intercropping commercial annual grains and legumes. However, no particular prior art farm implements or mulching step are provided for this intercropping method.

There are prior art approaches to planting annual grain crops in a single growing area. U.S. Pat. No. 5,140,917 (Swanson) describes a method and apparatus for seeding agricultural crops. Using this method, seeds are placed in residue free rows which are closely aligned with bands of deeply placed fertilizer. The plants from each seed are claimed to access more than one deep band of fertilizer. There is no intercropping component to Swanson's model, and Swanson requires increased fertilizer and seed costs for optimum results.

European Application 0132521 (Hilmer) describes intercropping with two or more crops on one piece of land per seasonal growing year. Hilmer used a grass/grain cluster/per row or a modular cluster row planter upon a slope contour.

U.S. Pat. No. 4,084,522 (Younger) describes a method by which soybean seeds are sown into a standing grain crop (e.g. wheat). When the grain crop is ripe, it is harvested at a height which is slightly greater than the height of the partially grown soybeans. Unlike my process, however, in Younger's model the wheat is planted first, while corn and soybeans are planted considerably later during the same growing season. Moreover, there is no specialized seed application in Younger's method.

U.S. Pat. No. 6,009,955 (Tarver III) is based upon the size and shape of furrows created by a modified harvesting machine. The planter creates these furrows just prior to planting or during the planting season. The Tarver invention compresses the furrow shape just prior to or during planting, to eliminate uneven soil. Koch describes corn planted in 30-inch rows with application of insecticides and liquid nitrogen fertilizer. There is a legume ground cover such as vetch or clover. According to this report, clover did not demonstrate potential as a perennial cover crop. Phillip Koch, "Legume Cover Crops for No-Till Corn" in J. F. Power, THE ROLE OF LEGUMES IN CONVERSATION TILLAGE SYSTEMS (1984).

Decker et al. describes winter legume cover crops which were seeded after fall corn harvests, and which were allowed to grow until corn planting the following spring. His results indicated that fall-seeded legumes at least partially replace artificial nitrogen fertilizers for maximum corn yields. A. M. Decker et al., "Fall Seeded Legumes' Nitrogen Contributions to No-Till Corn Production," in J. F. Power, supra.

Holderbaum reported results in which legumes were grown prior to corn, but later during the same growing season. In this model the legumes were clover and rye grass. According to this investigation, subsequent corn grain yields were highest when the cover crop was not removed. J. F. Hauderbaum et al., "Forage contributions for winter legume cover crops in no-till crop production," in J. F. Power, supra.

Scott and Burt reported intercropping red clover into corn seedlings when the corn seedlings were approximately six to twelve inches high. The scientists applied chemical herbicides to the seedlings during this investigation. According to Scott and Burt, they consistently obtained good crops by cultivating corn in 30-inch intercropped rows. High corn yields also consistently occurred following the plowdown of one year of red clover hay. Scott and Burt concluded that red clover or other legume establishment by intercropping into corn might become a beneficial management approach for nitrogen replenishment, organic matter addition and reduced erosion. T. W. Scott and Robert F. Burt, "Use of Red Clover in Corn Polyculture Systems," in J. F. Power, supra.

Paudey and Pendleton reported the planting of corn seed in 1.5 meter rows with corn seedlings spaced approximately 17 centimeters apart. Three rows of soybeans were planted between single rows of corn. The investigators applied herbicides and pesticides to the seedlings during the experiments. Forty-two days after planting, the two most exterior soybean rows were plowed into the cornrows in a traditional 'hilling up' procedure. R. K. Paudey and J. W. Pendleton, "Soybeans as a Green Manure in a Maize Intercropping System," EXPERIMENTAL AGRICULTURE 22:178-85 (1986).

Eadie et al. reported the effect of cereal cover crops upon weed control. The investigators hand planted cereal seed within plots which were approximately 2.3 meters wide and 8.0 meters long. The rows were approximately at 0.75 meter equidistantly spaced intervals. These investigators seeded the cereal cover crops immediately after the ridging cultivation at the 11-12 leaf stage of corn plants. According to the Eadie report, corn grain yields remained unchanged by cover crops seeded at the 11-12 leaf stage of corn, compared to bare soil treatment controls. Allan G. Eadie et al., "Integration of Cereal Cover Crops in a Ridge-Tillage Corn Production," WEED TECHNOLOGY 6 (3) (July-September 1992).

Lesoing and Francis stripcropped corn and soybeans to reduce erosion in eastern Nebraska from 1988 to 1990. Corn and soybeans were no-till planted in a north-south orientation in alternating 6.1 meter wide strips (eight rows, 0.76 meter between rows). Each row was approximately 46 meters in length, and each experimental planting areas comprised approximately 280 square meters. Lesoing and Francis planted corn seed at a density of approximately 66,250 seeds/ha. Between the corn strips they planted soybean seedlings in strips of eight rows at 475,000 seeds/ha.

According to this study, corn border row yields next to soybeans increased significantly compared with interior rows. These scientists suggested that water stress, light quality and shading are among the factors which affect crop yields at different stages of crop development. Gary W. Lesoing and Charles A. Francis, "Strip Intercropping Effects on Yield and Yield Components of Corn, Grain, Sorghum and Soybean," AGRONOMY J. 91: 807-13 (1999).

At least one farmer has reported that closer planting of crops in rows results in more equitable distribution of sunlight, soil moisture and nutrients. NO TILL FARMER (mid-January 1986).

SUMMARY OF THE INVENTION

My improved combined intercropping and mulching method includes an original approach to intercropping soybeans and corn in a conservation tillage system, but also includes other intercropping combinations of commercial crops. After blending of combined green manure and organic debris into the soil, the farmer seeds corn and soybeans simultaneously at soil temperatures of at least sixty degrees Fahrenheit (F.). The farmer then seeds the intercropped plants, and covers the seeded soil with remaining mulch made of the remaining combined chopped organic debris and green manure plants. Growing seedlings generate leaf canopies which choke weeds, thus decreasing the need for artificial chemical herbicides. Corn roots intertwine with soybean roots to generate an interwoven root system which holds soil in place.

Vertical layers of the crop leaf canopy also demonstrate a shading effect on soil, thereby increasing surface moisture, eliminating sun bleaching and cracking, and lowering soil temperature. The leaf canopy has an anti-erosion effect by slowing and diverting rain and irrigation moisture through the soil.

My invention also comprises the process of planting fields or gardens, in alternating rows or in other configurations, with two or more kinds of other commercial crops and legumes. In the preferred embodiment and best mode, the predetermined alternating rows and areas comprise corn and soybeans. Each crop can be in straight lines, or in curved or convoluted alignment, according to area geography.

In the preferred mode and best embodiment, soybeans are spaced a predetermined distance from each other and each adjacent corn row. In other embodiments, conventional cash crops such as corn and buckwheat alternate with plants such as Queen Anne's lace, vinegar weed, Pennsylvania smartweed or cornflowers. Sweet clover and annual grass are also candidates. Other possibilities, although not exclusively, include corn and potatoes, corn and peanuts or peanuts and soybeans. The alternating configuration of crops and other appropriate plant species also provides protection against insect pests. Insects can no longer eat from one side of a field to the other, because other selected crops become ecological barriers. Moreover, by using my new planting process, edible yields are greater for the same two dimensional or three dimensional section of a field or garden.

Intercropping also comprises the growth of quick-maturing vegetable crops between slower developing crops, to maximize available garden or field space. For example, soybeans are planted in spring or summer at 2 to 3 pounds of seeds per 1,000 square feet in traditional commercial situations. Soybeans are annuals and must be re-seeded every year; however, they tolerate poor drainage well and are ideal for nitrogen fixation. Plants such as adzuki and muny beans are fairly resistant to insect pests.

My process differs from the prior art because, although soybean pods and leaves are harvested early in fall, in my process the soybean roots and nitrogen nodules are left intact in the field. These roots and nodules provide a base for a no-till planting of a green manure crop. This intact system also provides a ground cover and subsoil root retention system during the winter months and following spring planting. Green manure is typically tilled into the soil in the spring with conventional farm machinery or hand implements, as the case may be. My process also differs because growing green mature plants are harvested and stored just prior to tilling and planting. The green manure is then reapplied to the soil as mulch after planting.

My improved method of planting commercial crops is synchronized with tilling and harvesting a portion of green manure which blends with field organic debris from previous crops. Green manure is dispersed through each row of corn and soybeans. The combined green manure then provides a mulch for a newly planted field. In the preferred embodiment and best mode of my method, each crop lies within straight rows, curved, or convoluted alignment, as required by the geography of the planting area. Also in the best mode and preferred embodiment, soybeans are spaced a predetermined distance from each other and adjacent cornrows. Corn roots interact with soybean roots and nodules to a depth of approximately four feet, while soybean stems wind around cornstalks.

In another embodiment and mode, alternating an appropriate third plant species protects against insect pests by mixing seed of similar sizes, such as soybeans and buckwheat. Preferably the farmer adds buckwheat seed to both corn seeds and soybean seeds just prior to planting, and as the seed drill and corn hoppers are filled with each of the two seed mixtures. Most preferably, the farmer would add approximately 10% by volume buckwheat seed to the soybean or corn seed hopper. Mixing occurs by a seed drill attachment for small seed and then alternating the third crop seeding within each 21-inch wide row with soybeans. As the buckwheat dies in midsummer, the corn and soybean roots adsorb phosphorus left by decomposing buckwheat plants. By fall when the corn and soybeans are harvested, the buckwheat grain should be absent in the fields.

In other models, intercropping with a third plant species, such as Pennsylvania smartweed, is particularly beneficial because insect pests prefer smartweed to corn and soybeans. The seed drill for planting soybeans, described infra, can deposit two different seed sizes simultaneously in the same row (such as soybeans and smartweed).

My invention also includes the use of prior art machines in new combinations, sequences and modifications. These changes decreases the labor, time, and amount of equipment required to till, simultaneously seed more than one crop in one pass, and mulch an intercropped field. By using my method with machinery in which the farmer has already invested, and with which he is familiar, the farmer finally has an incentive to intercrop his fields because there is no increased time, labor and machinery fuel and maintenance for a long-term commercial crop.

Consequently, one goal of my improved intercropping method is to prevent desiccating winds from harming crops and soil.

Another goal of my improved combined intercropping and mulching method is to insure that soil contains sufficient soluble nitrogenous and phosphorus compounds.

Another object of my combined intercropping and mulching method is to adapt my soybean and corn embodiment to an economical model for either large-scale or more modest agricultural units.

Another goal of my combined intercropping and mulching method is to add ground cover to fields which are generally uncovered and fallow.

Another goal of my combined intercropping and mulching method is to decrease soil exposure to air, erosion from sun, wind and running water.

Another goal of my process is to incorporate the commercial advantages of present day tillage with ecological benefits.

Another goal of my process is the annual quick tilling and planting of crops to decrease nutrient loss.

Another goal of my process is to eliminate sun-bleached soil.

Another goal of my process is to integrate conventional farm machinery into an intercropping and mulching process which does not require additional time, labor, fuel or investment.

These and other improvements will become apparent from my detailed description and drawings of my invention.

BRIEF DESCRIPTION OF THE DRAWINGS

FIG. 13A is an anterior schematic view of the modified seed drill and how tru-vee opener spacing is modified to form sets.

FIG. 15A illustrates a close up isolated anterior view of fork lift attachment and modified seed drill.

FIG. 15B illustrates an isolated schematic posterior view of the adjustment of seed drill row cover units.

Figure 1:
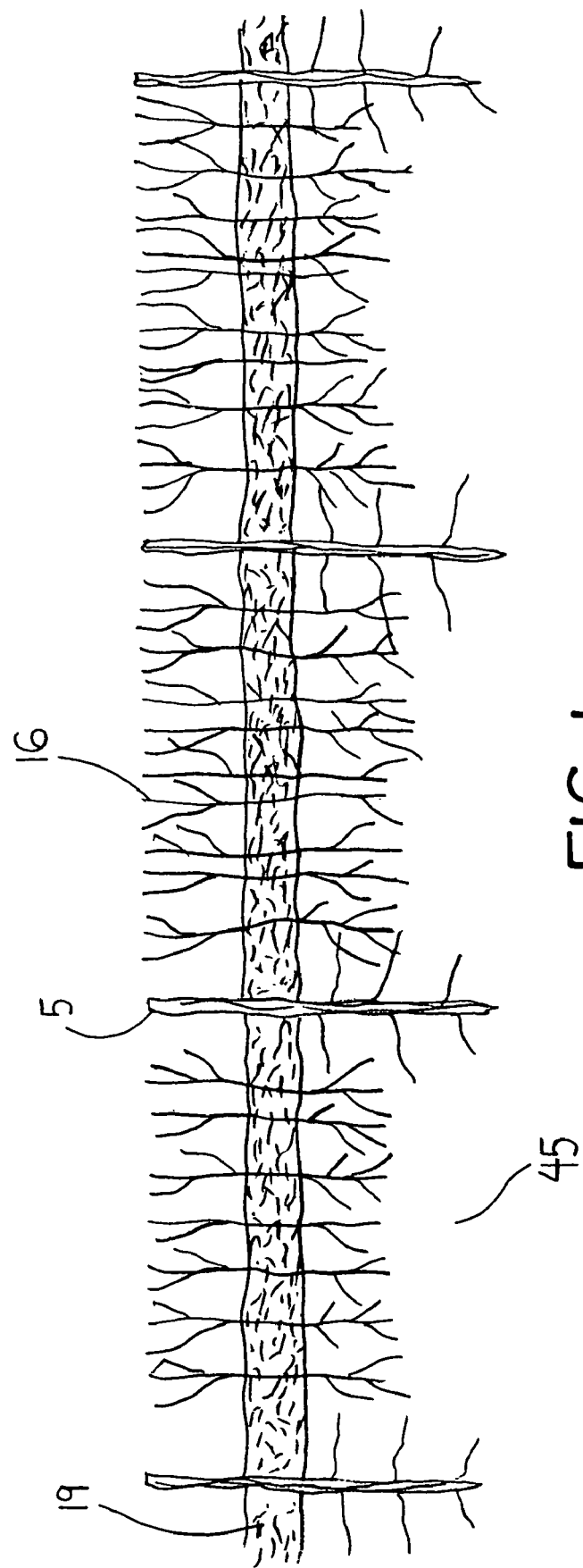
FIG. 1 illustrates a lateral view of a field in late fall after harvest and cutting of commercial crops and just prior to planting wheat and buckwheat.

DETAILED DESCRIPTION OF THE PREFERRED EMBODIMENT BEST MODE, AND OTHER EMBODIMENTS AND MODES

Introduction

My intercropping and mulching method 110 resolves the long-felt need to intercrop economically while preserving the soil for the long term. The following steps comprises the best mode of my process 110 in most basic format, and without additional artificial pesticides, fertilizers and herbicides:
- (i) no-till planting of green manure plants 44a during the fall within soil 45 of a predetermined area which contains organic debris 19,
- (ii) harvesting a portion of the green manure plants 44a for mulch 20;
- (iii) quick tilling a portion of green manure plants 44a and organic debris 19 into the soil 45 of this predetermined area the following spring, and
- (iii) intercropping of commercial crops, including at least one legume, immediately thereafter within the same predetermined soil, and
- (iv) spreading a layer of combination mulch 20, also comprising green manure plants 44a and organic debris 19, over the surface of the intercropped seeded soil 45.

Green manure plants 44a are no-till seeded during the previous fall, or spring of the following commercial planting season. The farmer next mows green manure plants 44a and plant debris 19, which becomes combination mulch 20 and is collected in a forage box wagon 51, infra. He then tills soil 45 with a portion of combined green manure 44 approximately nine to 14 inches deep into the same soil 45. After seeding the intercropped commercial crops, the farmer covers soil 45 containing intercropped commercial seeds with combined mulch 20. Combined mulch 20 also comprises plant debris or other organic residue 19 which remains from the fall commercial harvest (such as soybean and cornstalk stubble), along with chopped green manure plants 44a.

For intercropped corn and soybeans, preferably there is approximately one (1) corn seed 10 per eight (8) linear inches of soil. This specific seeding in the best mode and preferred embodiment results in approximately five (5) mature corn plants 10c per square yard of topsoil 45a. Soybean seeds 12 are planted at approximately eight (8) to twenty (20) seeds per square foot of topsoil in the best mode. However, in other modes seed concentrations vary outside these ranges.

My preferred method of combined intercropping and mulching 110 provides best results in a midwestern climate. The preferred soils are typical of southwestern lower Michigan and northern Indiana, especially Berrien County in Michigan and LaPorte County in Indiana. Crops are preferably planted in rimer loamy fine sand soils, above a river or drainage way. Soils such as rimer are easily washed away, so my combined method 110 is particularly useful in these areas. However, method 110 is also beneficial upon other farmland, as well as irrigated fields. Intercropping and green manure growth is optimal when soil 45 is planted the previous growing season with commercial soybeans 16c.

The seeds for the best mode of my intercroppping and mulching method 110 are:
- (1) soybean seeds 12, DeKalb variety CX303RR, Lot. No. 1744EJMLA, germ 85;
- (2) corn seeds 10, DeKalb Hybrid DK 567, Lot. No. 1748JXEH, germ 95.

These preferred varieties of soybean seeds 12 and corn seeds 10 are available from:

Buchanan Feed Mill, Inc.
P.O. Box 109
Railroad Street
Buchanan, Mich. 49107-1698

Other satisfactory corn seed 10 and soybean seed 12 for my improved intercropping and mulching process 110 are also available from:

Strefling Farms,
Galien, Mich. 49113
and
D & S Farms
Galien, Mich. 49113

Corn seeds 10 are R-Ready Corn®, Variety No. DK 493 R while soybean seeds 12 are 2702 ASGROW® lot number 5371EAAM, ASGROW® Variety No. AG 2702.

The preferred buckwheat and wheat seed is available from:

Baroda City Mills
8923 First Street
Baroda, Mich. 49101
Lot No. BW-2001

Planting and Harvesting of Green Manure Plants 44a

My preferred method 110 for an intercropped field soil 45 incorporates maturing wheat plants 17 and buckwheat 18 into combination green manure 44. The farmer begins the process 110 in late summer or early fall after harvest of an earlier commercial crop (preferably corn 10c and/or soybeans 16c) upon pre-selected soil 45. In the best mode the farmer no-till plants wheat seeds 17b and buckwheat seeds 18b in buckwheat furrows 39. These buckwheat furrows 39 are positioned among cornstalks 5 and a three inch stubble of soybeans 16 which remain after the fall harvest.

Referring initially to FIG. 1, decomposed cornstalks 5 and other organic residue 19 contain droppings from Japanese beetles. Japanese beetles prefer to eat Pennsylvania smartweed instead of corn 10c and soybean plants 16, and their droppings add to organic residue 19. In other modes of method 110, the farmer plants buckwheat seed 18b over previously unplanted fallow soil 45. In these modes, the farmer intercrops buckwheat seed 18b between corn rows 8 in previously fallow soil 45. When he subsequently plants wheat 17 in the fall after mature corn 10c is harvested, there is a green manure 44 which becomes mulch 20 for a single crop of mature corn 10c or soybeans 12.

Figure 2:
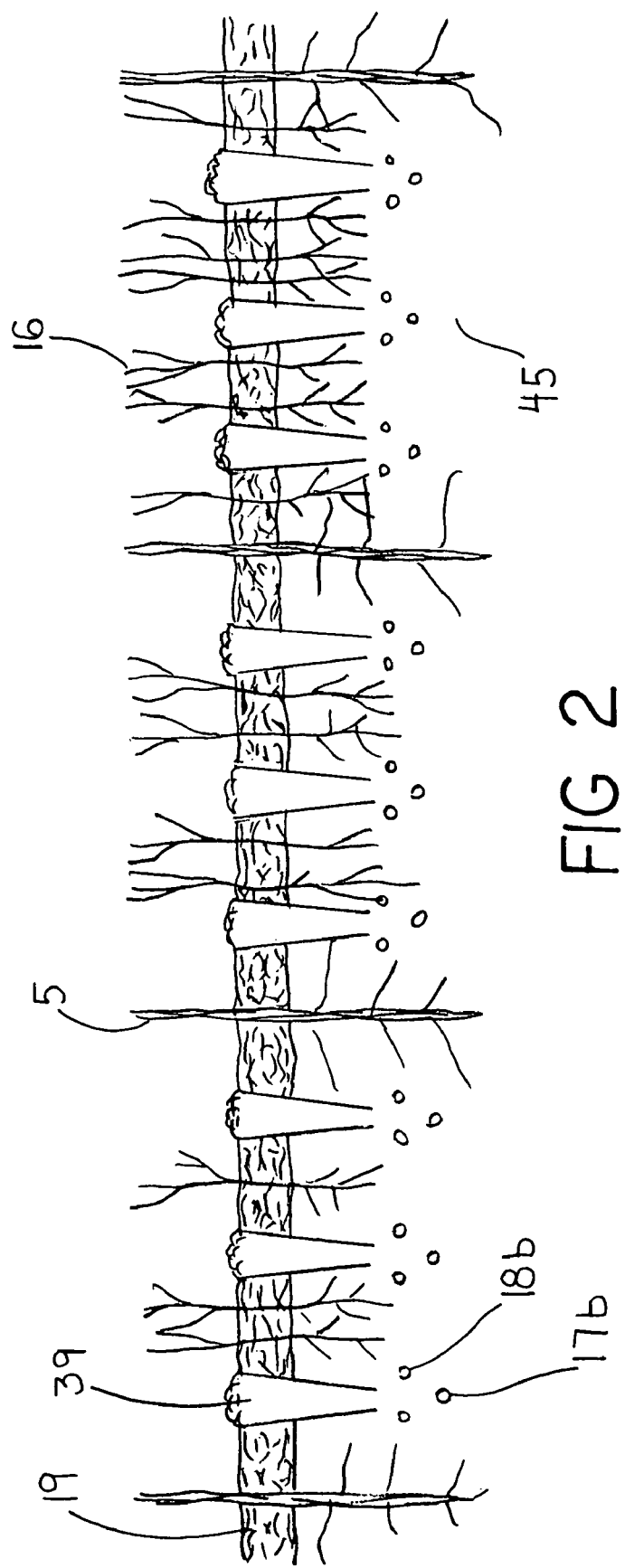
FIG. 2 illustrates a lateral view of a field in late fall after harvest of commercial crops with wheat and with buckwheat seed as a no-till planting over cornstalks and soybean stubble.

Sprouting wheat 17 and buckwheat 18 promote soil 45 retention during winter. Although wheat 17 grows slowly over the winter, by spring it is well established and matures quickly, thereby preventing weeds from sprouting. Referring to FIG. 2, the farmer can seed buckwheat 18b in the fall, spring or summer at (i) approximately two to three pounds of seed per 1,000 square feet, and (ii) simultaneously seeding commercial intercropped plants such as corn and soybeans. Buckwheat 18 is preferred as a green manure plant 44a, because it tolerates infertile and acidic soils but accumulates phosphorus. By adding buckwheat 18b to wheat seed 17b in the fall as a green manure plant 44a, and replanting buckwheat 18 with corn 5 and soybeans 12 in spring over previously planted wheat 17, there is additional phosphorus for soil 45.

The recommended conventional no-till seeding machine 84 for wheat 17 and buckwheat 18 is a CASE 5400 no till grain drill. However, a JOHN DEERE 560 no-till drill, or a JOHN DEERE 1860 no-till air drill are also satisfactory.

Figure 3:
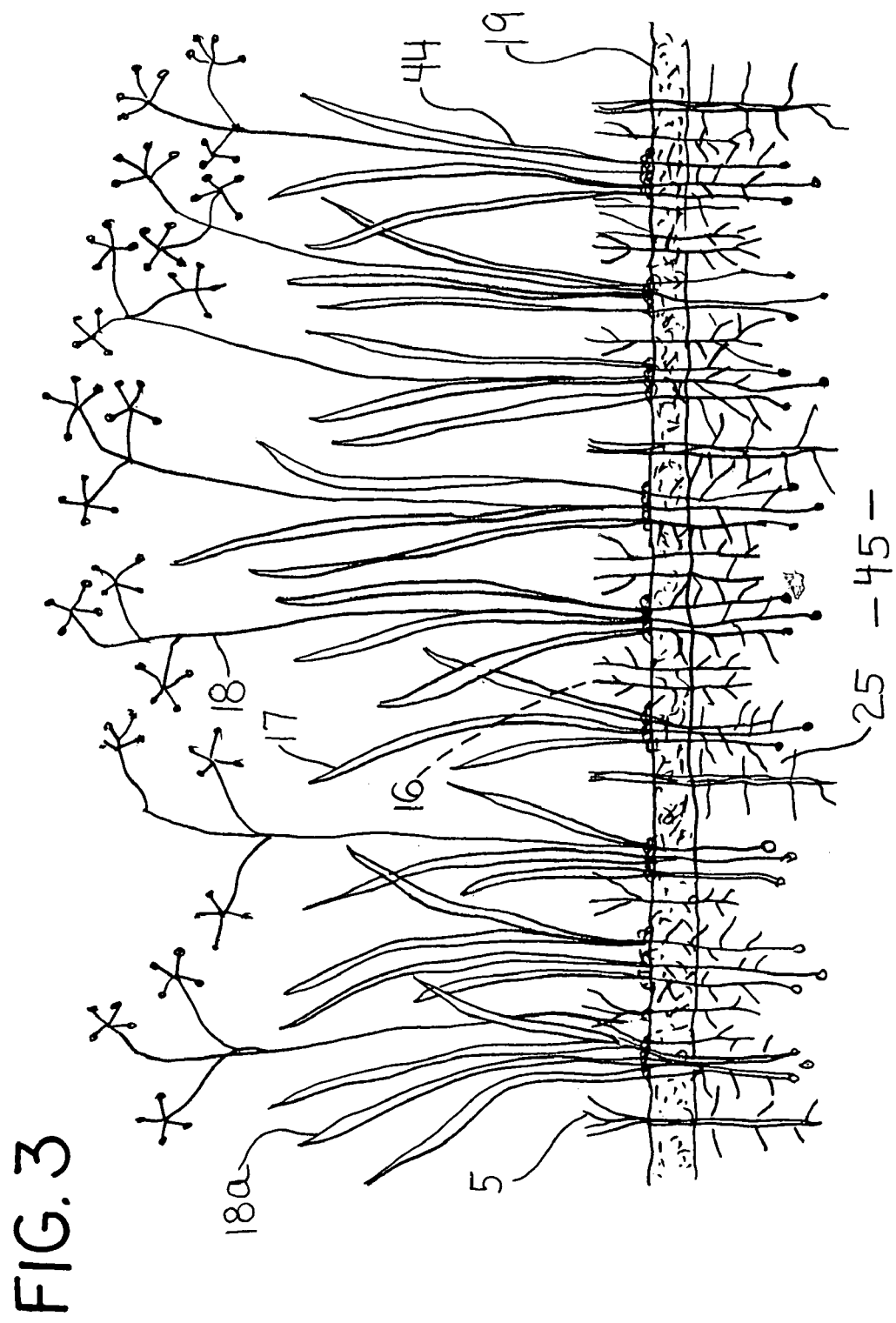
FIG. 3 illustrates a lateral view of a field in early spring just prior to mowing of green manure plants, corn stalks and soybean stubble.

Referring to FIG. 3, by the following spring young wheat and/or buckwheat plants 18a is approximately 14 to 20 inches in height.

The CASE 5400 No-till grain drill for creating furrows 39 and seeding wheat 17 and/or buckwheat 18 is available from:
   Case Canada Corporation
   450 Sherman Ave.
   Hamilton, Ontario L8N, 4C5 Canada
   or
   Case Corporation
   700 State Street
   Racine, Wis. 53404

The following annuals are also satisfactory for providing combination mulch 20 and combination green manure 44 for the following spring intercropped planting:

(a) Austrian peas, which are seeded in late summer or fall in well-drained soils, and flourish in warmer climates.

(b) Hairy vetch, which is seeded in late summer or fall, with 1-2 pounds of seeds per 1,200 square feet. Hairy vetch tolerates moderate drainage, grows well in northern climates and is a good source of soluble nitrogen soil compounds.

(c) Soybeans, which are seeded in spring or summer, at 2-31b. of seed per 1,000 square feet. Soybeans tolerate poor drainage well.

(d) Annual rye grass which is seeded in spring at approximately one to two pounds of seed per 1,000 square feet. Annual rye grass tolerates a wide range of soils, provides a quickly placed soil cover, and subsequently provides sufficient nutrients for a slow growing commercial crop such as fruit trees, grape vineyards, berry fields, watermelons and tomatoes.

(e) Winter rye which is seeded in late summer or fall at approximately two to three pounds of seed per 1,000 square feet. Winter rye prefers well drained soils, but it is also very winter hardy and grows well in early spring.

Production of Combined Green Manure 44

Referring to FIG. 3, the upper portions of young wheat and/or buckwheat plants 18a remain viable until it is mowed immediately prior to spring tilling. The top approximate one-half of the upper portions of young wheat and/or buckwheat plants 18a is chopped and blended with organic debris 19 to become combined mulch 20, as explained in more detail infra. The remaining approximately one-half of the bottom portions of green manure plants 44 (such as upper portions of young wheat and/or buckwheat plants 18a), is tilled into soil 45 with organic debris 19 prior to spring seeding of intercropped commercial plants.

Figure 4:
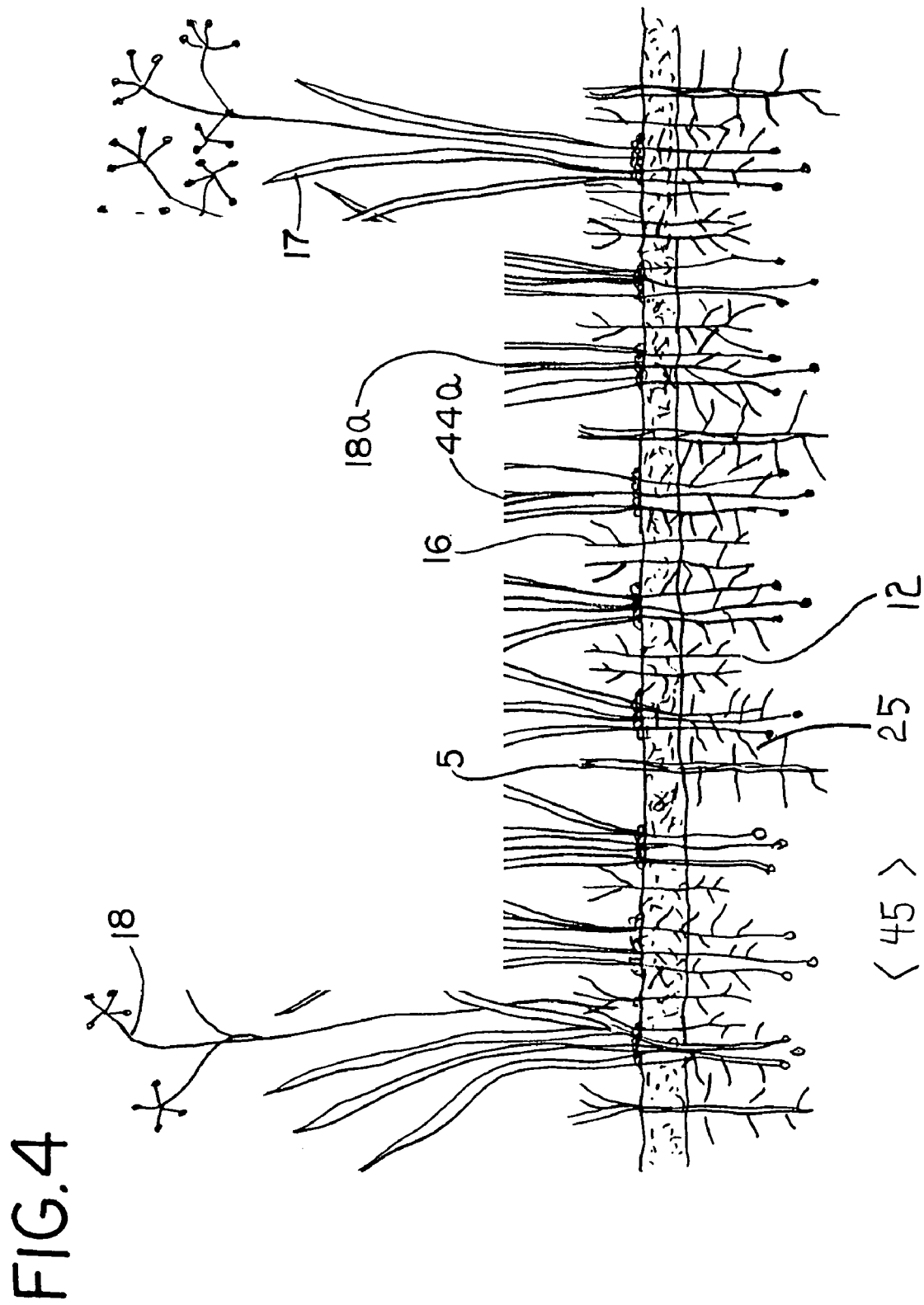
FIG. 4 is a lateral view of mowed upper portions of wheat and buckwheat, resulting in a twenty foot path prior to tillage, and with adjacent unmowed upper portions of wheat and buckwheat.

Referring to FIG. 4, in the preferred embodiment and best mode the farmer mows upper portions of young wheat and/or buckwheat plants 18a, residual corn stalks 5 and organic debris 19 approximately three inches to ten inches above soil 45. The determination of the exact height of mowed upper portions of young wheat and/or buckwheat plants 18a to properly cover soil 45 is empirical. This determination also depends upon leaf density of upper portions of young wheat and/or buckwheat plants 18a. Leaf density primarily depends upon nutrients in the soil, weather conditions, and time of the year, including the required 60 degrees Fahrenheit (F.) soil temperature. Consequently, each field has a different leaf density and different plant heights.

Buckwheat 18 is generally mowed along with wheat 17. However, buckwheat 18 can be reseeded with corn 10 and soybean seed 12 for a summer planting, to produce additional nutrients. Please see FIG. 11. The recommended conventional machine for mowing upper portions of young wheat and/or buckwheat 18a, residual cornstalks 5 and residual soybean 16 stems (thereby creating combined mulch 20) is prior art INTERNATIONAL 650 Forage Harvester. This particular mowing machine comprises a cutting bar unit and is available from:
   International Harvester Company
   401 North Michigan Avenue
   Chicago, Ill. 60611

INTERNATIONAL 650 Forage Harvester mows, rakes and collects mowed green manure plants 44a and organic debris 19 for a lateral distance 101 of approximate twenty feet across a field. INTERNATIONAL 650 Forage Harvester simultaneously mows and blows upper portions of young wheat and/or buckwheat plants grass 18a into towed forage wagon 51, for storage prior to mixing and chopping within bale chopper 108, infra. INTERNATIONAL 650 Forage Harvester both mows and collects upper portions of young wheat and/or buckwheat plants 18a for larger commercial fields, while conventional small mowing and gathering tools are satisfactory for gardens and small fields.

A 5460 or 5440 Forage Harvester with mower bar unit is also satisfactory, as well as other farm machinery for cutting and collecting mowed upper portions of young wheat and/or buckwheat plants 18a. Forage Harvesters are self-propelled forage harvesters 50 from John Deere, Inc. With a 5460 or 5440 Forage Harvester the farmer mows an approximately 20 feet wide interval of upper portions of young wheat and/or buckwheat plants 18a in the first step of process 110. However, Forage Harvesters can only collect a portion of the mowed upper portions of young wheat and/or buckwheat plants 18a within a twenty-foot wide path, so two passes may be necessary.

The farmer mows this twenty-foot wide path across the field in an east/west direction and then tills the same twenty-foot wide path prior to intercropping. Later during the growing season, sunlight falls between rows, and the tall crop (such as corn) does not shade the shorter crop (such as soybeans). After mowing and raking, in other modes the farmer deposits organic fertilizer into soil 45, such as animal manure or minerals such as lime.

Tilling of Combined Green Manure 44 into Soil 45

Figure 5:
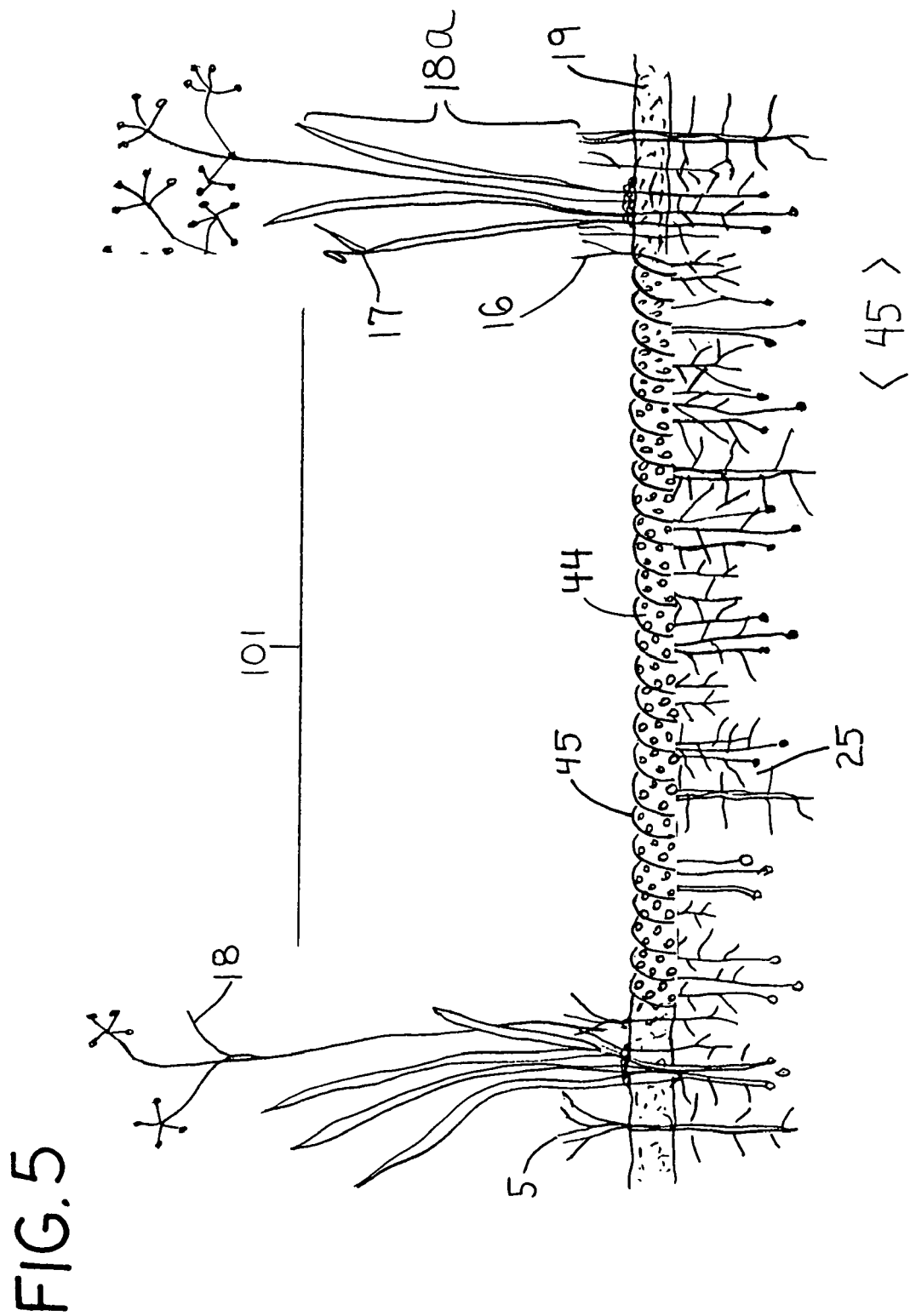
FIG. 5 illustrates soil treated by a first tilling machine in a twenty-foot width with adjacent wheat grass on each side of approximately twenty-foot width.

Immediately after mowing of the first twenty-foot width 101 of upper portions of young wheat and/or buckwheat plants 18a, the farmer quickly tills soil 45 with organic residue 19 (such as cornstalks 5) and a three-inch stubble of remaining soybeans 16, along with a portion of wheat grass 18a. FIG. 5. A preferred conventional machine 58 tilling is the 3800 series field cultivator for larger commercial fields from:
   AGCO® GLENCOE®
   4205 River Green Parkway
   Duluth, Ga. 30096
   1-800-767-3221
   or
   Kuhn EL 201/400
   5390 East Seneca Street
   Vernon, N.Y. 13426-0840

For larger commercial fields, the most preferred power tilling machines are available from:
   Kuhn Farm Machinery, Inc.
   5390 East Seneca Street
   Vernon, N.Y. 13476-0840
   Phone: 1-315-829-2620
   Models: EL35, EL50, EL80N, EL100N, and EL 140N
   and are distributed by:
   H.F.S. Tractor
   Barode, Mich. 49101 and Niles, Mich. 49120

Figure 8:
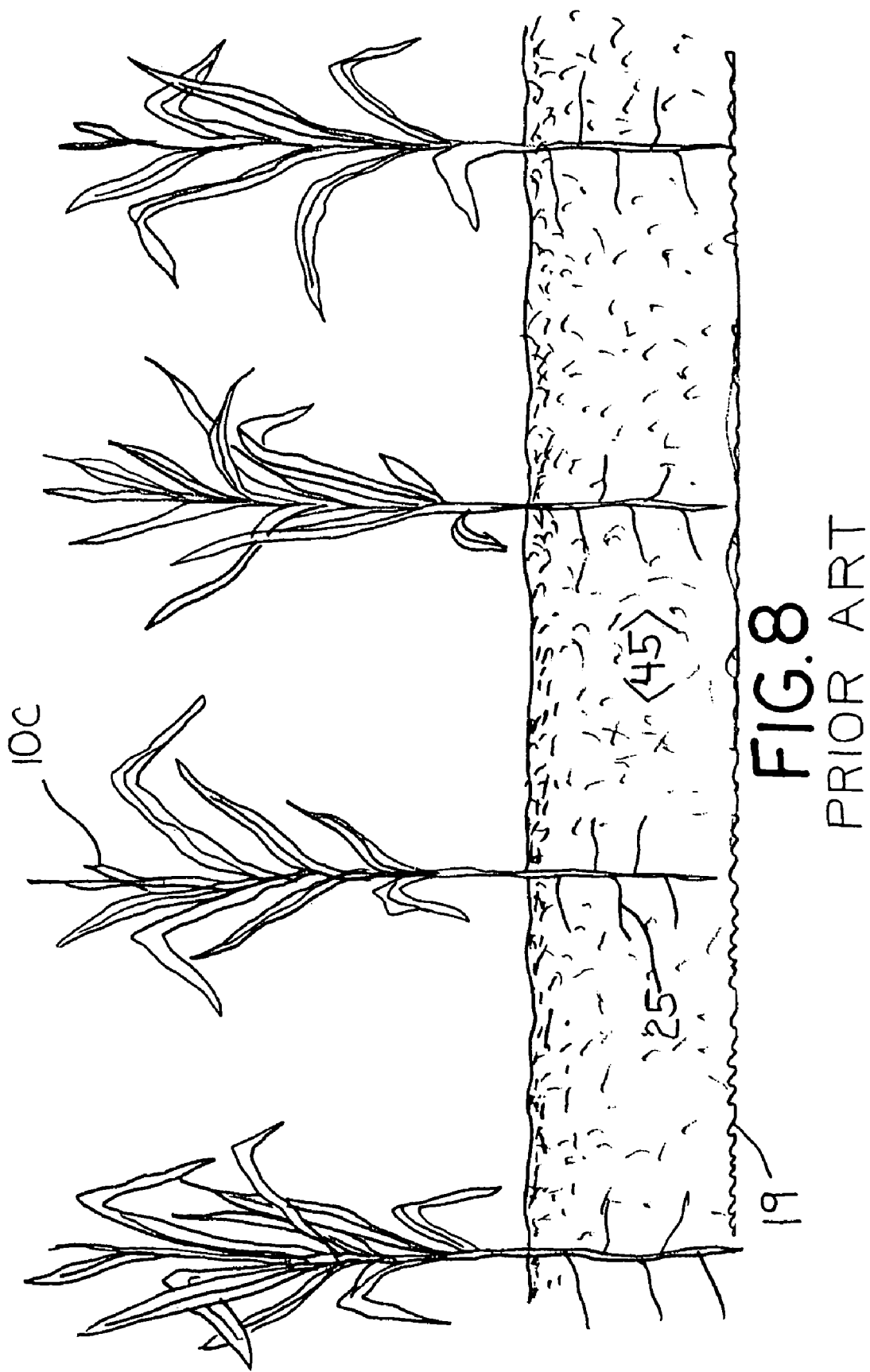
FIG. 8 illustrates conventionally plowed soil with non-decomposed organic debris under the soil in a single crop field.

The farmer uses a cultivator to till weeds under soil 45 between maturing commercial intercropped plants, and so the cultivator blades are shaped with different working widths than those of tilling machines. Referring to FIG. 8, less preferably a plow turns soil 45 to destroy weeds, or to even and break soil 45 prior to planting commercial crops. However, a large tilling machine is more efficient than a plow, in part because tilling machines disk and level soil simultaneously.

Figure 6:
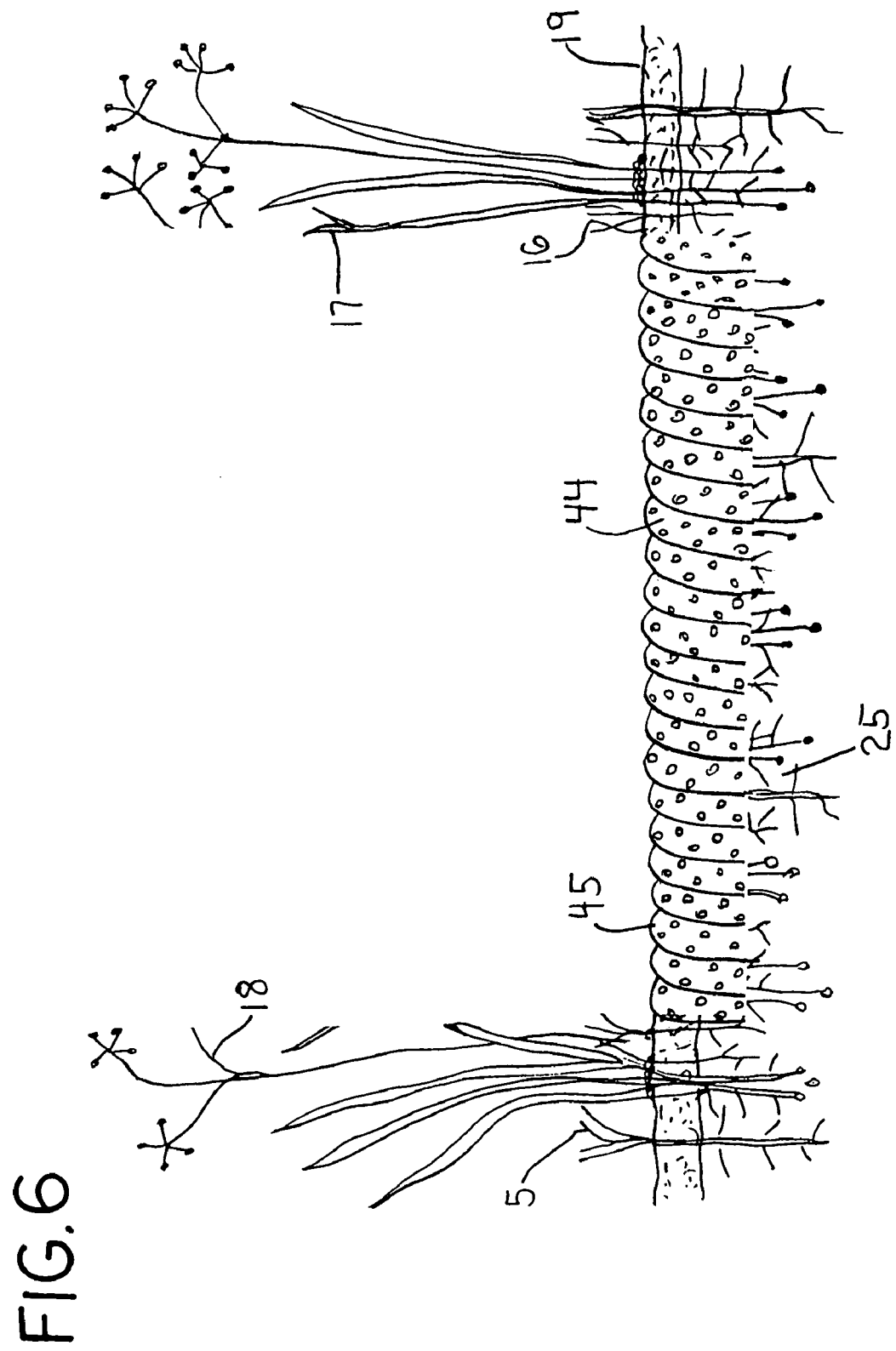
FIG. 6 illustrates the soil of FIG. 5 treated by a second tilling machine to a greater depth within a twenty-foot field width.
Figure 7:
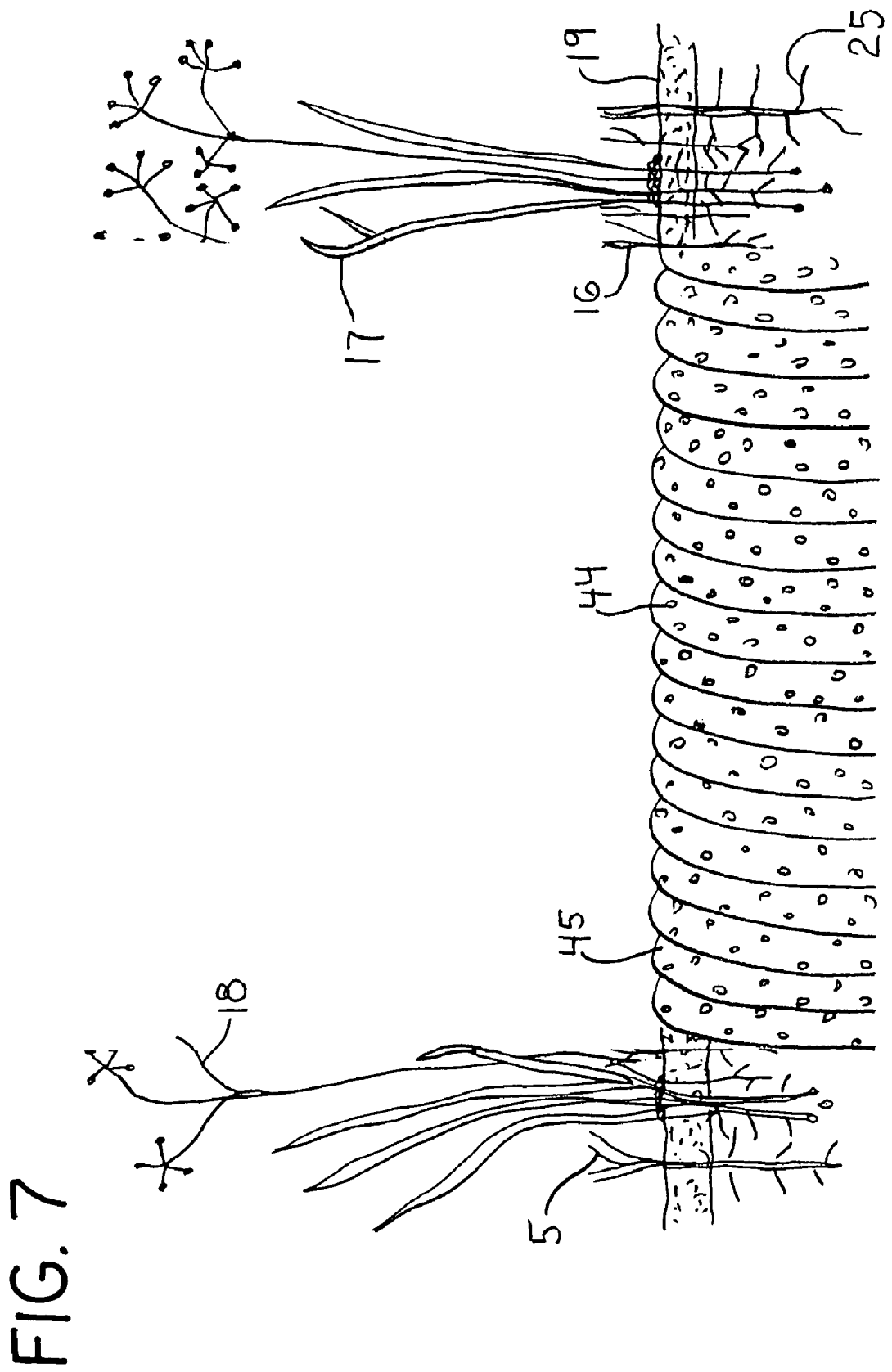
FIG. 7 illustrates soil of FIG. 5 treated by a third tilling machine to a final greatest depth within a twenty-foot width path, and with adjacent unmowed upper portions of wheat and buckwheat.

In the best mode and preferred embodiment for larger fields, a power tilling machine tills and blends soil 45 and combination green manure 44 to a depth of approximately nine (9) to fourteen (14) inches. Most preferred devices are consecutively moving power tilling machines which blend combination green manure 44 with soil 45 at a greater depth with every pass (i.e., one unidirectional trip across the preselected field). As seen in FIGS. 5, 6 and 7, most preferably remaining roots 25 are tilled at a progressively greater soil depth by consecutive tilling machines.

In smaller areas, a gardener uses a conventional manual garden tiller to evenly disperse combined green manure 44 throughout soil 45. In smaller areas, the gardener only tills sufficient soil 45 to plant two corn rows 8 and then deposit soybean seeds 12 within a predetermined soybean area 9 between corn rows 8. By running the conventional tiller over the same area three times, the gardener achieves the desired blended soil 45 and combined green manure 44 consistency. Rototillers for smaller fields are available from:

Troy-Bilt Rototillers
P.O. Box 368023
Cleveland, Ohio 44136
1-330-273-4550,
and are also distributed through:
H.F.S. Tractor
1218 South 11th St.
Niles, Mich. 49120

For attachment to smaller tractors 97, there is the AG side shift rotating tiller from:

Celli S.p.A.
Via Zignola,2/B
47100 Forli,
Tel (0543) 754145

A rototiller (for smaller areas), garden tiller (for smaller areas) or power tiller is superior to merely layering organic debris 19 with a plow. Referring again to FIG. 8, a prior art plow merely cuts soil 45 and 'flips it over,' and consequently organic debris 19 may not decompose by the next spring planting season. My new method 110 uses tillers for this step, and thereby decreases fertilizer requirements. Method 110 also evenly disperses combined green manure 44 throughout the soil, thereby creating additional air spaces for new plant roots.

Consecutive use of three power tilling machines also allows each attached tractor 97 to follow the other as closely as possible. Three power tilling machines can also overlap in an east/west direction for optimal sunlight. Moreover, one large power tilling machine tills an approximately thirteen feet pass width (i.e, perpendicular to direction of tractor 97 movement). By simultaneously using three tilling machines the farmer overlaps each pass for approximately a seven-foot width.

A twenty-foot wide path (or pass) 101 comprises approximately eight thirty-inch wide corn rows 8, between which the farmer can plant approximately seven twenty-one inch wide alternating soybean area/rows 9 (and one row 9 extending past eighth corn row 8). However, other crops can also be planted in this particular intercropping pattern, and/or the intercropping pattern can comprise different widths.

One-Step Seeding of Intercropped Commercial Plants
Introduction

In the best mode of my invention 110, a conventional seed drill 96 is modified to plant an approximately 21-inch wide area 9 of soybean seeds 12, between linearly planted corn seed 10. The modified seed drill 96 preferably leaves alternating intervening unplanted areas 8b which are then seeded with a conventional corn planter 95. FIG. 8.

For large fields, the following machinery is preferred for seeding intercropped commercial plants immediately after tilling and blending combination green manure 44 with soil 45:

(i) General utility tractors 97 such as WHITE 6105 midsize tractors from:
AGCO® WHITE
4830 River Green Parkway
Duluth, Ga. 30136

(ii) Corn seed planters 95, such as KINZE® 3000 series planters, and which are available from:
KINZE® Manufacturing, Inc.
I-80 at Exit 216
Williamsburg, Iowa 52361-0806

Other satisfactory corn seed planters 95 include SUNFLOWER® Series 9000 Grain Drills, which are available from:
Sunflower Manufacturing Co., Inc.
P.O. Box 566
1 Sunflower Drive
Beloit, Kans. 67420
1-800-748-8481
and John Deer model NO. 1720 MaxEmerge® PLUS Planters.

(iii) Recommended seed drills 96 for soybean seeds 12 are available from:
John Deere, Inc. distributors,
and
Sunflower Manufacturing, Inc.
P.O. Box 5566
1 Sunflower Drive
Beloit, Kans. 67420
Phone: 1-800-748-8481

Satisfactory Series 9000 grain drills 96 are also available from Sunflower Manufacturing Co., Inc. for this same purpose.

Figure 9:
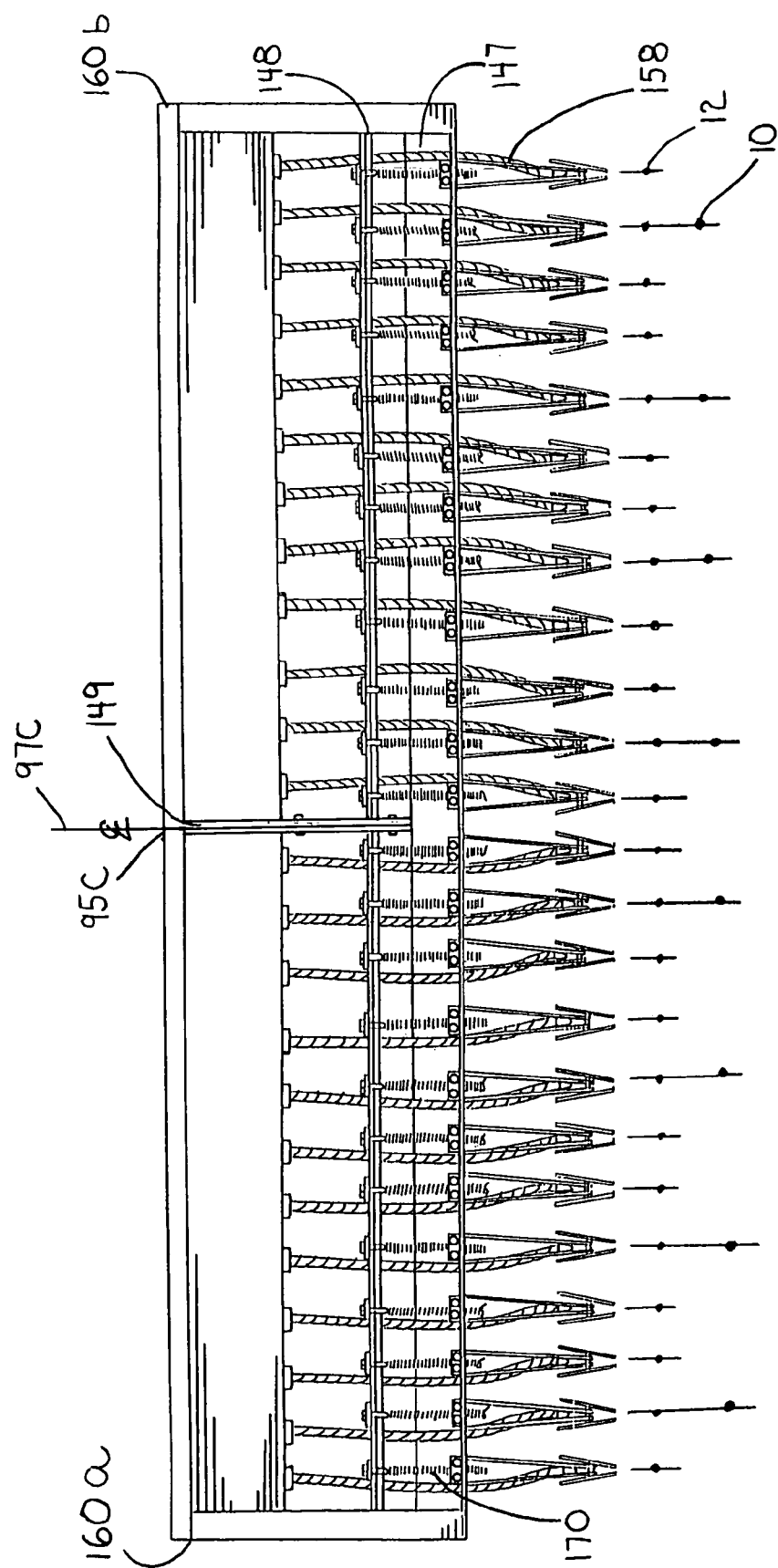
FIG. 9 illustrates an anterior view of a prior art twenty-foot wide seed drill with prior art uniform horizontal distances between adjacent equidistantly spaced tru-vee openers.
Figure 10:
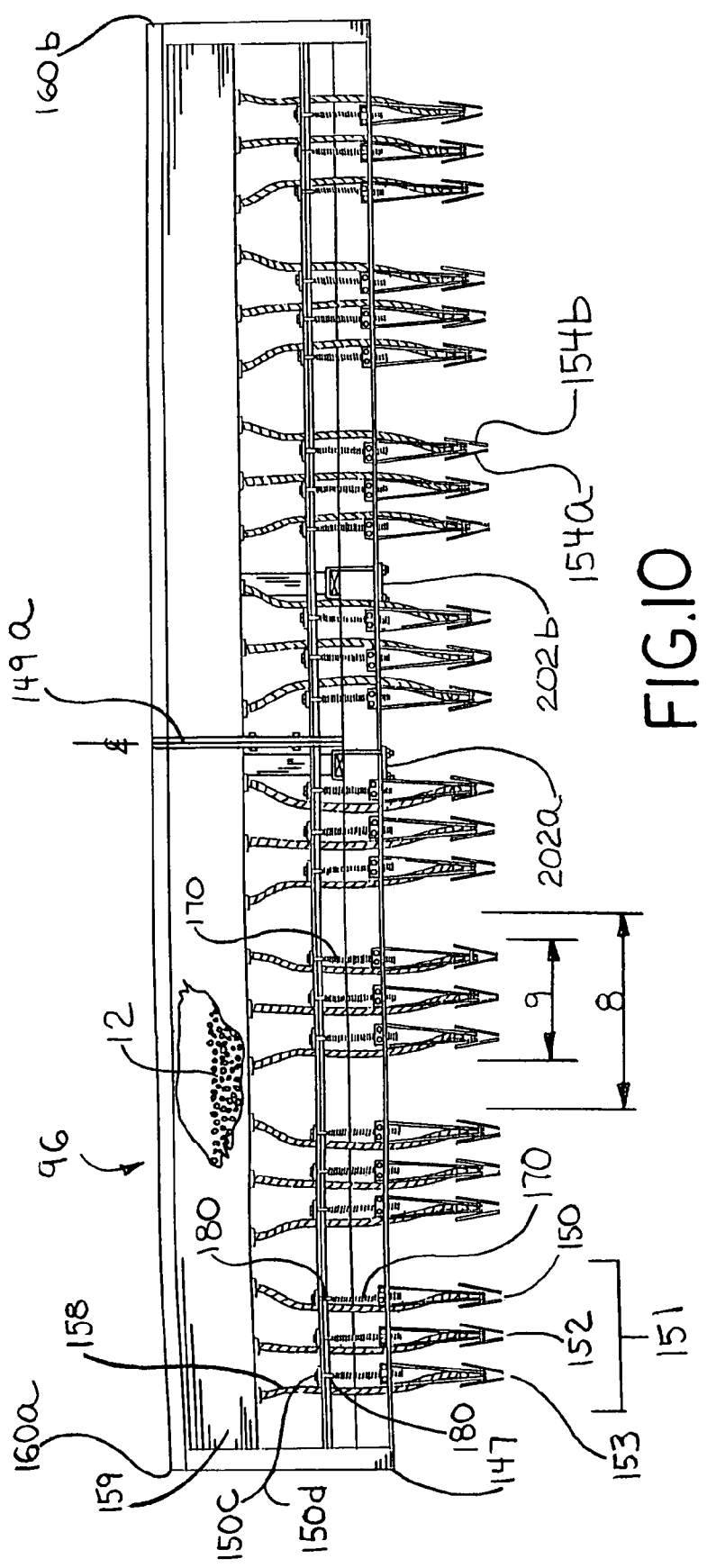
FIG. 10 illustrates an anterior schematic view of the modified seed drill of FIG. 9 with eight sets of re-aligned tru-vee openers.

In my invention each corn furrow 90 is located within a corn row 8, and two consecutive corn furrows 90 are approximately 30 inches laterally apart. However, the prior art unmodified JOHN DEERE 520 seed drill 96 of FIG. 9 fails to provide separate growth areas for each crop. Referring to FIG. 10, with method 110 the farmer preferably uses a modified JOHN DEERE 520 seed drill 96 for soybean seeds 12. The farmer can then sow soybean seeds 12 within an approximately twenty-one inch wide area 9 which is centrally located within a previously designated corn row 8. Each corn furrow 90 is approximately four inches deep and linearly deposited corn seeds 10 are placed approximately eight (8) inches apart.

Figure 11:
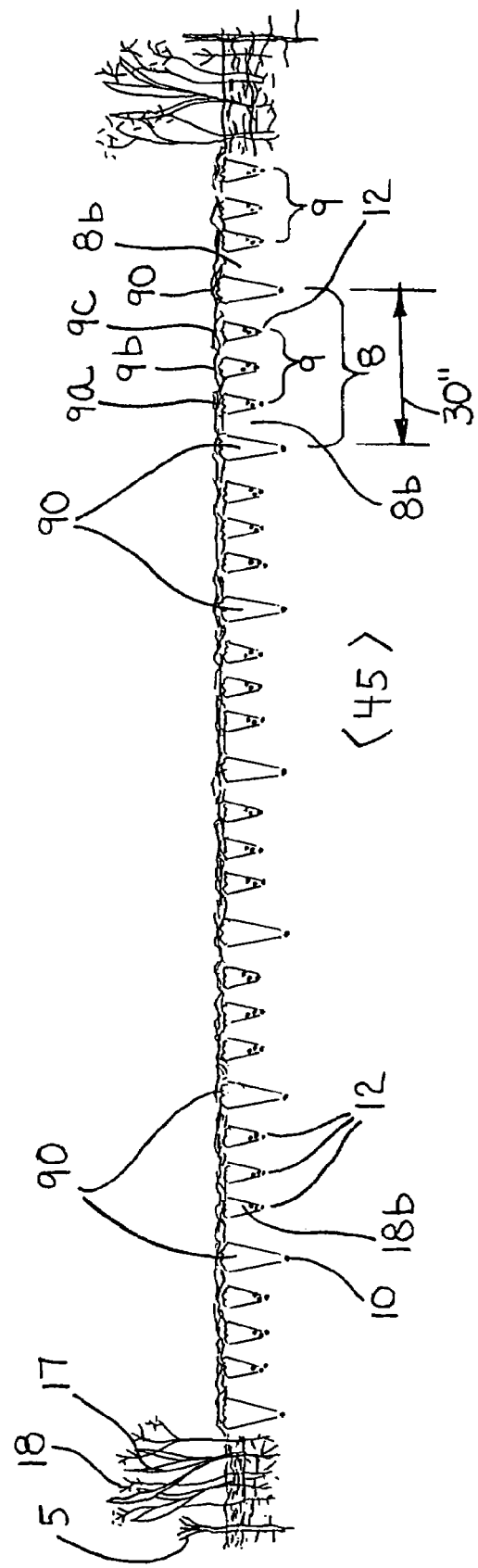
FIG. 11 illustrates a post-tilling twenty-foot path intercropped with corn seeds and soybean seeds.

Referring to FIG. 11, each soybean area 9 contains three subrow 9a, 9b, 9c, with 9b centrally located subrow within each set of three such subrows. The distance between each lateral subrow 9a, 9c (i.e., adjacent to central subrow 9b) and central subrow 9b (i.e., in the approximate center of corn row 8) is approximately seven inches. Within a twenty foot wide path there are eight corn rows 8 with eight 21-inch wide areas 9 (each containing three subrows 9a, 9b, 9c) within seven of the eight corn rows 8. One set of three seven-inch subrows 9a, 9b, 9c extends beyond the eighth corn row 8.

Adjustment of Tru-Vee Openers 150, 153 for Seeding Subrows 9a, 9b, 9c

To create the seeding pattern of FIG. 11, a prior art seed drill 96 such as the preferred John DEER 520 seed drill must comprise tru-vee openers 150, 152, 153 and row cover units 160. The prior art random distribution of soybean seed 12 (within an approximately 20 foot wide path) by a seed drill 96 is not a disadvantage for single crop fields. In contrast, to effectively intercrop two crops in an alternating pattern my modified seed drill 96 is adjusted to seed three subrows 9a, 9b, 9c of soybean seeds 12 within two linearly aligned corn furrows 90 during one pass. In this best mode and preferred embodiment, three consecutive subrows 9a, 9b, 9c form a single approximately 21-inch wide soybean area 9 within each consecutive 30-inch wide corn row 8.

Tru-vee openers 150, 152, 153 are features of prior art JOHN DEER 520 seed drill 96. Referring to FIG. 9, conventionally each such tru-vee opener 150, 152, 153 is uniformly either seven inches or ten inches from an adjacent tru-vee opener 150, 152, 153 along horizontal opener draw bar 147. Each tru-vee opener 150, 152, 153 deposits soybeans seeds 12, and also comprises a posterior attached row cover unit 140 to cover each soybean subrow 9a, 9b, 9c with soil 45.

Referring now to FIG. 10, the preferred modified seed drill 96 is approximately twenty feet in width. The linear distance along opener draw bar 147 from right exterior edge 160a to drill center frame 149 is approximately ten feet, as is the distance between left exterior edge 160b and drill center frame 149. On either side of drill center frame 149 are four sets 151 of three tru-vee openers 150, 152, 153. Each tru-vee opener 150, 152, 153 opens soil 45 with first and second disk blades 154a, 154b. Blades 154a, 154b are angled to each other, thereby forming a "v" with an apex at the point closest to soil 45. As tru-vee openers 150, 152, 153 move forward, blades 154a, 154b turn and cut into soil 45, creating a v-shaped indentation. A seed tube 158 is positioned centrally between both blades to deposit seeds within each v-shaped soil indentation.

Figure 12:
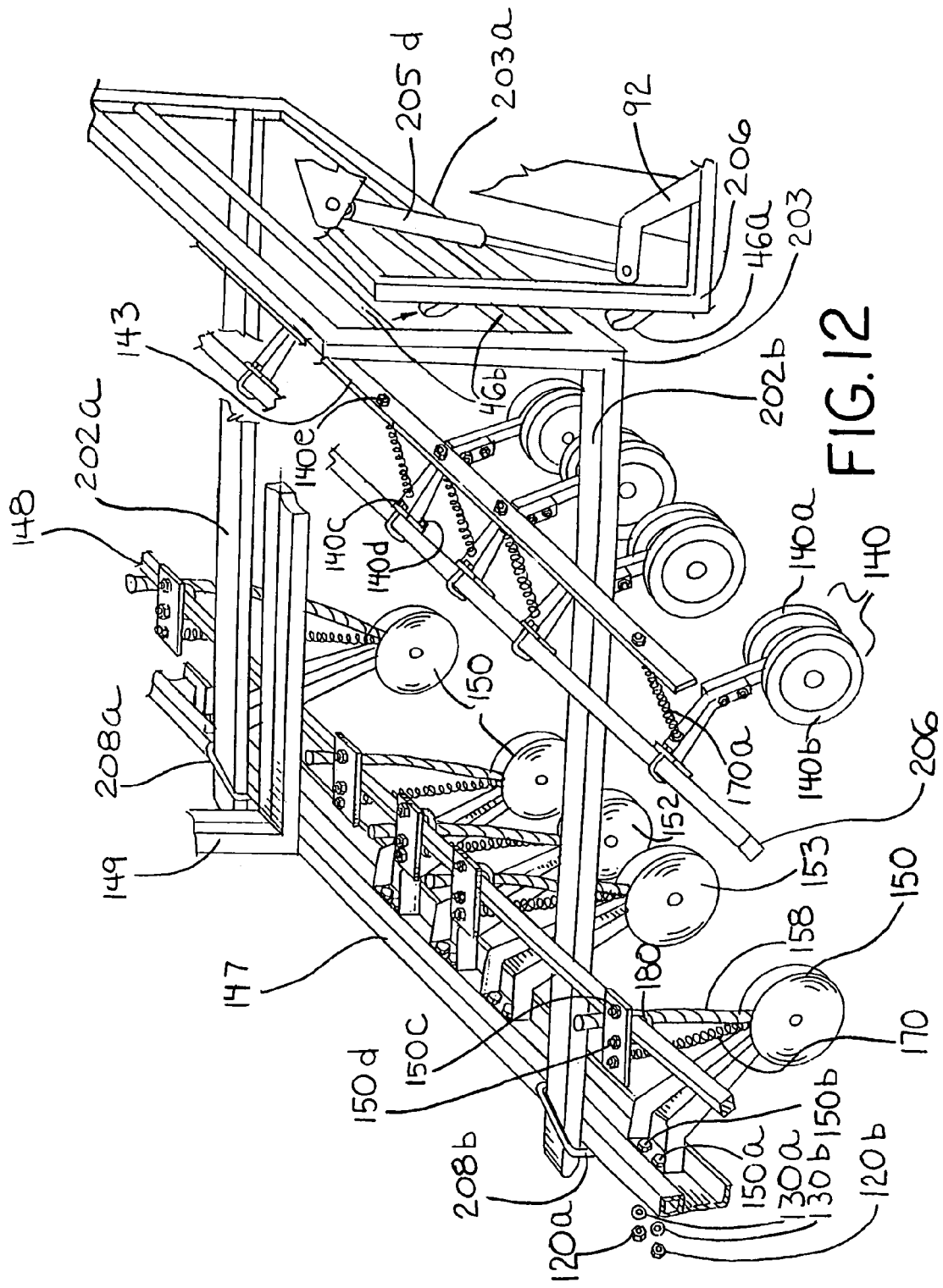
FIG. 12 illustrates an isolated partial lateral view of a modified seed drill.

As seen in FIG. 12, each tru-vee opener 150, 152, 153 within set 151 attaches to opener draw bar 147 by first and second bolts 150a, 150b respectively. In turn, bolts 150a, 150b attach to opener draw bar 147 by first, and second drill nuts 120a, 120b respectively, with first and second drill washers 130a, 130b respectively. Drill nuts 120a, 120b and washers 130a, 130b must be removed together with bolts 150a, 150b, to move each tru-vee opener 150, 153 horizontally along opener draw bar 147.

As seen in FIG. 12, third frame 148 lies above tru-vee openers 150, 152, 153, and comprises opener springs 170. Third frame 148 holds each opener spring 170 in place above each corresponding tru-vee opener 150,152 or 153, as the case may be. Each opener spring 170 presses downward on its corresponding tru-vee opener 150, 152, 153, thereby providing stabilization over a hard soil surface. Each opener spring 170 presses its corresponding tru-vee opener 150, 152, 153 into soil 45 in the same manner as prior art seed drills.

Referring to FIGS. 10 and 12, each opener spring 170 also has an upper U-clamp 180 which attaches each opener spring 170 to third frame 148 with first and second nuts 150c, 150d respectively. When nuts 150c, 150d and bolts 150a, 150b are removed, a person can manually slide each tru-vee opener 150, 152, 153 horizontally along opener draw bar 147 and third frame 148. Each tru-vee opener 150, 152, 153 also comprises single seed tube 158 which connects each corresponding tru-vee opener 150, 152 or 153 to seed bin 159 in a manner well known in the agricultural industry.

Referring now to FIGS. 10 and 13A, each set 151 of tru-vee openers comprises a first tru-vee opener 150 which is most interiorly positioned for each particular set 151 (i.e, first true-vee opener 150 is closest to center frame 149 within each set 151). To adjust seed drill 96 for three subrows 9a, 9b, 9c (in which first lateral subrow 9a and second lateral subrow 9c are each approximately seven inches from central subrow 9b) the farmer first removes bolts 150a, 150b, nuts 120a, 120b, 150c, 150d and washers 130a, 130b from each first tru-vee opener 150.

The farmer then slides each first tru-vee opener 150 (along opener draw bar 147 and third frame 148) three inches closer to adjacent second tru-vee opener 152 (also located on opener draw bar 147). Each first tru-vee opener 150 is now approximately seven inches from the more exteriorly located adjacent tru-vee opener 152. As seen in FIG. 13A, each first tru-vee opener 150 is also now closer to first or second opener draw bar exterior edge 160a, 160b respectively, as the case may be.

The farmer replaces bolts 150a, 150b, with nuts 120a, 120b and washers 130a, 130b for each relocated first tru-vee opener 150. To tighten each first true-vee opener 150 in its new position, the farmer replaces bolts 150a, 150b through opener draw bar 147. He also replaces washers 130a, 130b on bolts 150a, 150b, and tightens drill nuts 150c, 150d which hold each U-clamp 180 to third frame 148.

Still referring to FIGS. 10 and 13A, second tru-vee opener 152 within each set 151 requires no adjustment and comprises the middle tru-vee opener 152 for seeding each central subrow 9b within a 21 inch wide soybean area 9. However, each third tru-vee opener 153 is most distant (within its set 151) from center frame 149. After removing bolts 150a, 150b and nuts 150c, 150d (similarly to first tru-vee openers 150), the farmer manually slides each third tru-vee opener 153 inwardly toward center frame center 149 by approximately three linear inches toward second tru-vee opener 152 within appropriate set 151. Drill nuts 120, washers 130, bolts 150a, 150b, and nuts 150c, 150d are then tightened in their new positions as with first tru-vee opener 150. First and third tru-vee openers 150, 153 within each set 151 are now each approximately seven inches apart from their corresponding central tru-vee opener 152.

Horizontal Adjustment of Seed Drill Row Cover Units 140

Referring now to FIGS. 12 and 15B (posterior view of seed drill 96), in both the prior art and my modified seed drill 96, each row cover unit 140 comprises two wheels 140a, 140b which connect to row cover unit frame 206. Each row cover unit 140 corresponds to a single tru-vee opener 150, 152 or 153 which is anterior to that row cover unit 140. Each row cover unit 140 also comprises a corresponding spring 170a which attaches row cover unit 140 to footboard 143.

After adjusting tru-vee openers 150,153 as discussed supra, the farmer removes drill nuts 140c, 140d, and 140e from each corresponding row cover unit 140. The farmer now slides each row cover unit 140 directly posterior to a corresponding re-aligned tru-vee opener 150, 153 as the case may be. Each corresponding row cover unit 140 moves directly posterior to each opener 150 or 153. Drill nuts 140c, 140d, 140e are then tightened, thereby retaining each row cover unit 140 in its new horizontal position along row cover unit frame 206 and foot board 143.

Figure 13:
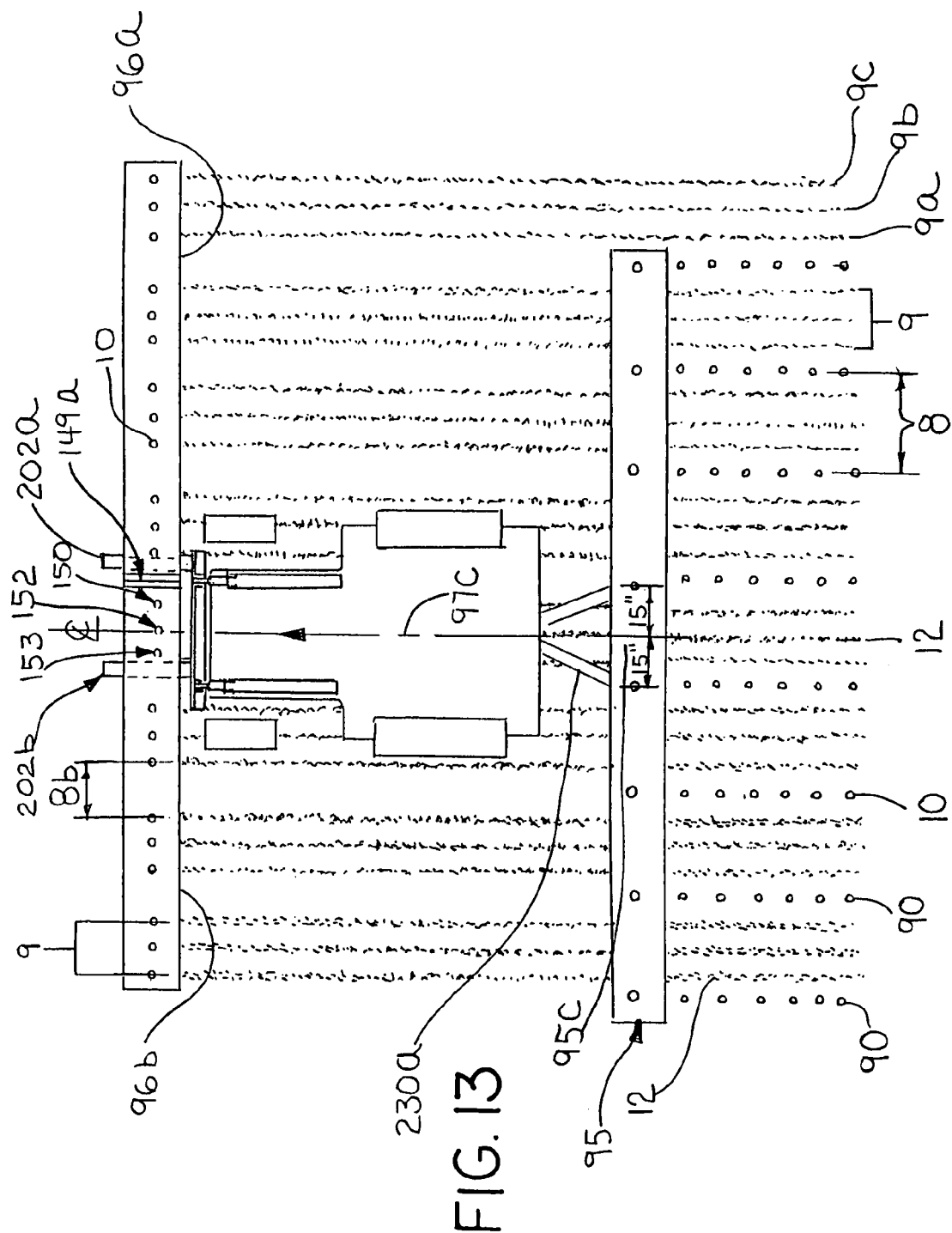
FIG. 13 illustrates a top plan schematic view of a modified seed drill moving forward over a field with a corn planter posteriorly hitched to the tractor.

The farmer continues this procedure for each row cover unit 140 which corresponds to tru-vee opener 150 or 153. Tru-vee opener 152 in each set 151 within a set is not moved, so its corresponding row cover unit 140 is also left unchanged. As seen in FIG. 13, this spacing avoids disturbance of corn seed 10 by placing three subrows 9a, 9b, 9c approximately midway within one 30-inch wide corn row 8.

The seeding of three subrows 9a, 9b, 9c with soybean seeds 12 between consecutive corn rows 8 containing corn seed 10a, comprises the preferred embodiment and best mode of my improved method 110. Method 110 produces a quick tilled intercropped strip in an east-west direction for optimal sun exposure, and is repeated as a one-step tilling and planting across each field as described supra. Three subrows 9a, 9b, 9c within consecutive 30-inch wide corn rows 8 also provides sufficient area and soil depth for both corn seed 10 and soybean seed 12 to mature, while preventing soil 45 between adjacent soybean areas 9 from remaining unplanted.

If modified in the above described manner, preferred seed drill 96 does not plant over previously or posterior seeded corn rows 8, because each set 151 of tru-vee openers 150, 152, 153 leaves consecutive unplanted soil 45 for corn seed 10 between adjacent sets 151. Please see FIG. 13. In sum, modified seed drill 520 seeds eight areas 9 of three soybean subrows 9a, 9b, 9c with alternating unplanted areas 8b (which are seeded by conventional corn planter 95 towed by tractor 97). Soybean seeds 12 are planted anterior to tractor 97, with one area 9 of subrows 9a, 9b, 9c always directly anterior to tractor center 97c.

Other prior seed drills 96 are satisfactory for my method 110 in other modes, if they are adjustable for furrow depth and width, as well as row width. A 30-inch wide corn row 8 width comprising single straight furrows 90 results in uniform, 21-inch spacing of mature soybean plants 16 within corn row 8. Within each soybean area 9, soybean seeds 12 are planted at approximately eight (8) to twenty (20) seeds per square foot of soil 45. In other embodiments, the farmer plants with first and second tractors 97. First tractor 97 pulls JOHN DEER 520 seed drill 96, as modified supra, and seed drill 96 plants three subrows 9a, 9b, 9c while second tractor 97 pulls attached prior art corn planter 95. The most common prior art spacing for corn rows 8 is approximately thirty inches, but row spacing can range from approximately fifteen to forty inches.

Mounting Seed Drill 96 to Front End Loader 200 and Fork Lift Attachment 203

The above modified seed drill 96 must be operatively attached to tractor anterior 97a. In the best mode and preferred embodiment (i.e., to intercrop corn seed 10 and soybean seed 12 in one pass) the farmer equips tractor anterior 97a with a prior art front end loader 200 and prior art fork lift attachment 203.

Figure 14:
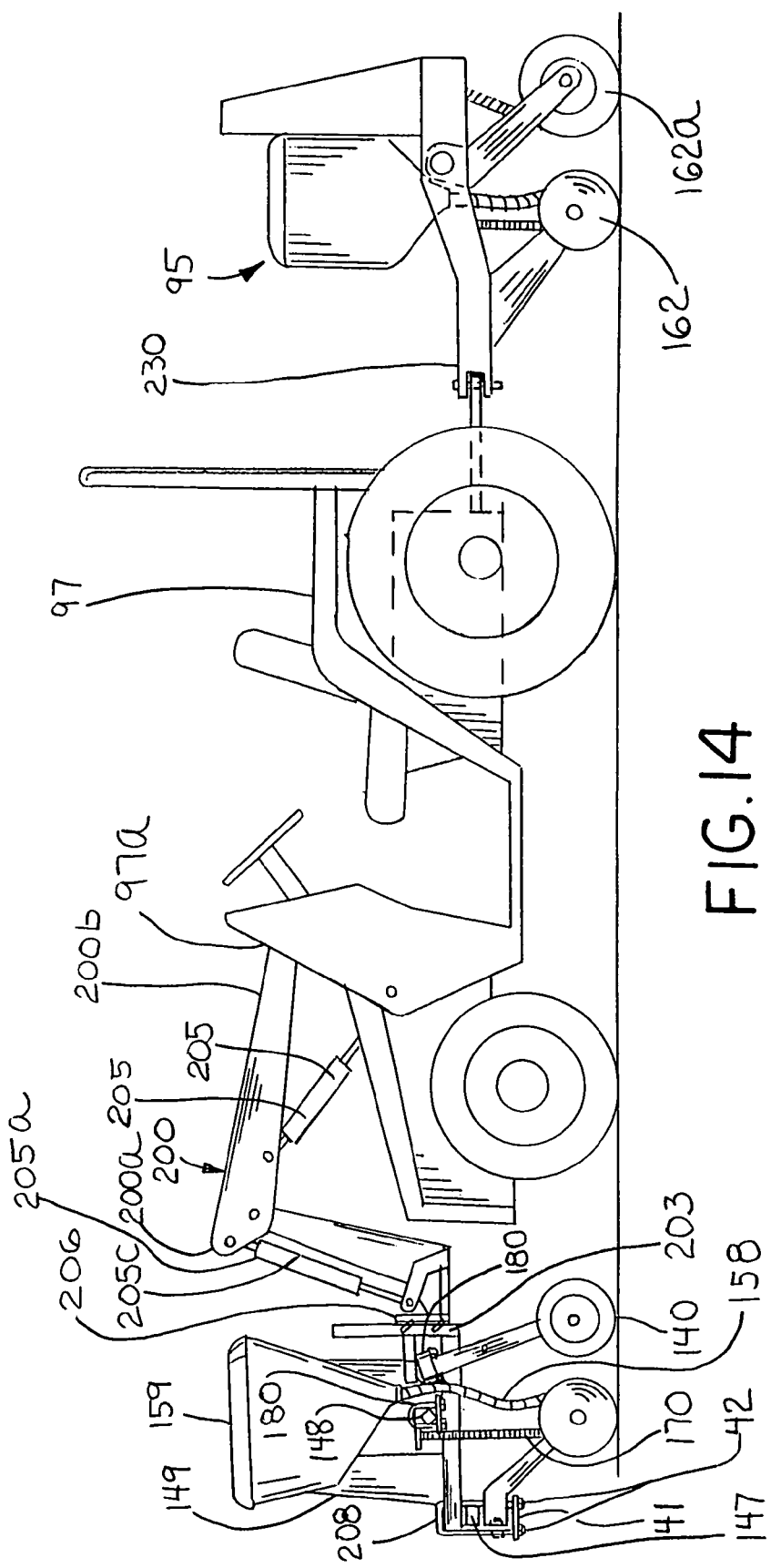
FIG. 14 illustrates a lateral isolated view of the seed drill of FIG. 10 with fork lift attachment and hydraulic lifts, tractor and prior art corn planter.

Referring to FIGS. 14 and 15A, front end loader 200 maintains proper alignment of modified seed drill 96 with tractor 97 and conventional corn planter 95 by connecting seed drill 96 rigidly to tractor anterior 97a through forks 202a, 202b. Front end loader 200 vertically raises and lowers this same modified seed drill 96, while seed drill 96 remains in the same rigid anterior position. Front end loader 200 and fork lift attachment 203 are centered upon tractor anterior 97a, so first horizontal side 96a of seed drill 96 is same length as second horizontal side 96b.

Still referring to FIGS. 14 and 15A, the user mounts fork lift attachment 203 upon tru-vee opener set 150, 152, 153 which is immediately to the left or right of center support frame 149. In the appended figures, forklift attachment 203 is mounted to right side 160b so that a single tru-vee opener 152 is directly anterior to tractor center 97c. In this manner the farmer can mount seed drill 96 to tractor 97 at one of two positions, as long as front end loader 200 is positioned upon one center set 151 of tru-vee openers 150, 152,153.

Still referring to FIG. 15A, center support frame 149 is located in the center of seed drill 96, so tractor center 97c aligns with one tru-vee opener 152. One soybean subrow 9b is now planted directly anterior to tractor center 97c. However, it is necessary to offset center frame 149 from tractor center 97c, to plant soybean subrow 9a directly anterior to tractor center 97c.

Figure 12A:
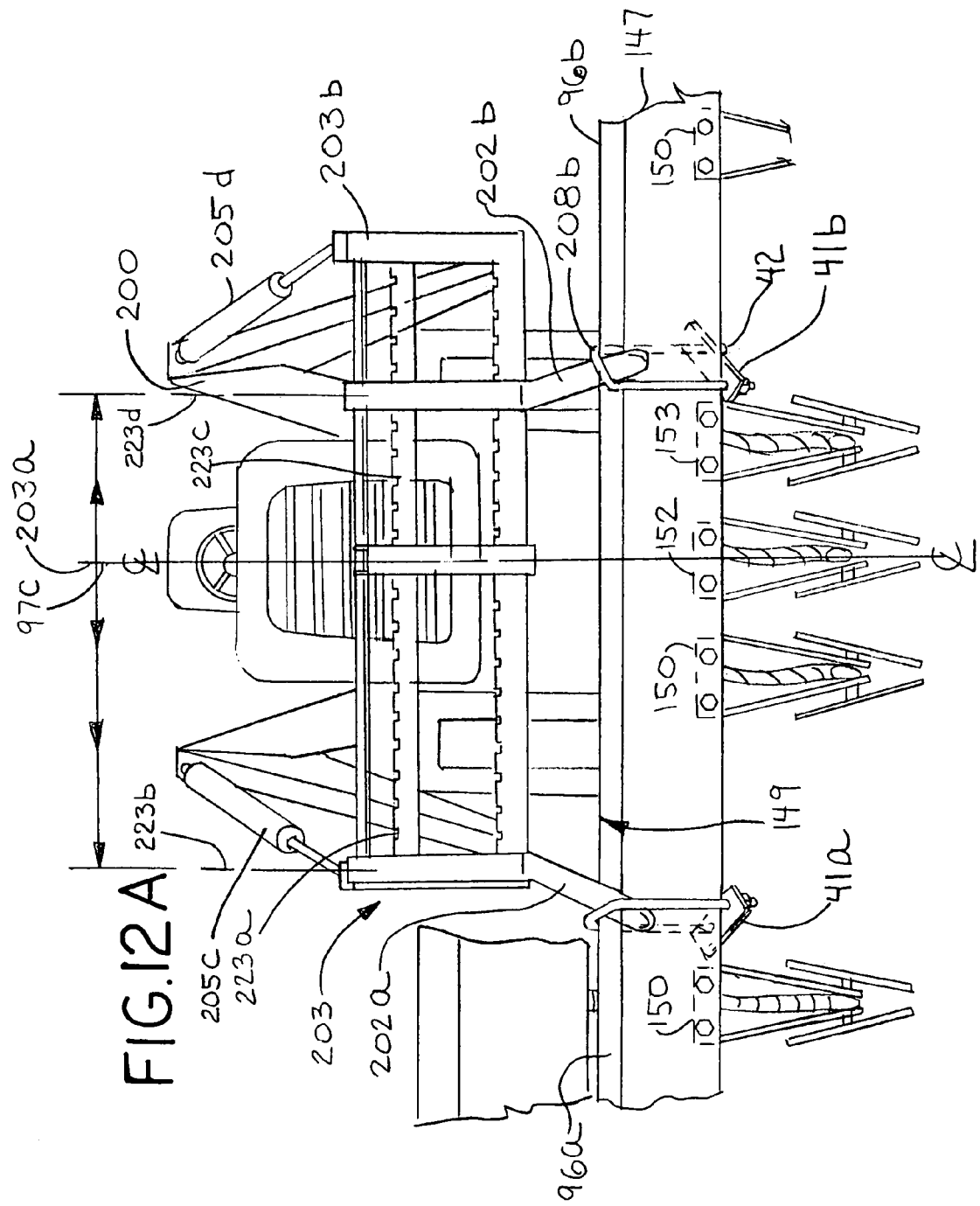
FIG. 12A illustrates a schematic anterior view of tru-vee openers with fork positions and attachments.
Figure 12B:
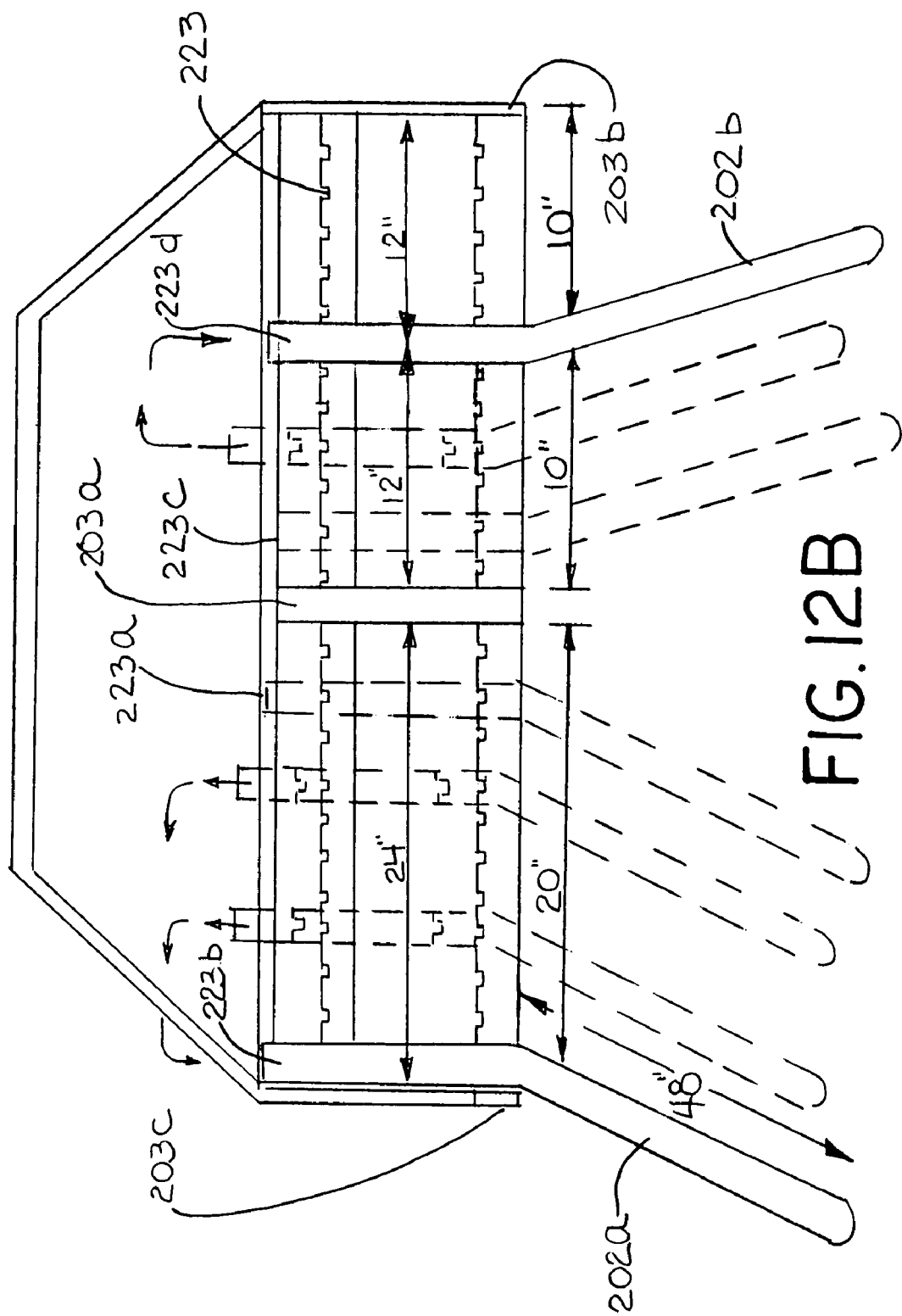
FIG. 12B illustrates an isolated schematic view of the fork lift attachment and adjustment of the forks.

Referring to FIGS. 12B and 15A, the farmer mounts seed drill 96 upon prior art fork lift attachment 203 by first and second attached forks 202a, 202b respectively. Forks 202a, 202b are attached to fork lift attachment 203, while attachment 203 is attached to front end loader 200. As seen in FIG. 12A, first fork 202a fully opens outward from fork lift center 203a, while second fork 202b opens half-way from forklift center 203a. As seen in FIG. 12, properly positioned forks 202a, 202b lie under row cover unit frame 206 and third frame 148, but rest upon tru-vee opener frame 147.

Referring to FIG. 10, modified seed drill 96 comprises eight sets 151 of tru-vee openers 150, 152, 153 on each JOHN DEER 520 seed drill 96: (i) four on the first side of the tractor center 97c, one set 151 between forks 202a, 202b, see infra, and (ii) three sets 151 on the second side of tractor center 97c. To balance seed drill 96, forks 202a, 202b each slide alongside three tru-vee openers 150, 152, 153 and center frame 149. As a result, one set 151 of tru-vee openers 150, 152, 153 fits between forks 202a, 202b after proper mounting of seed drill 96, infra. Please see FIGS. 12 and 15A.

Referring now to FIGS. 13 and 15A, the preferred prior art front end loader 200 comprises first, second, third and fourth hydraulic cylinders 205a, 205b, 205c, 205d (generically 205) operated by an interior tractor oil pump. First and second hydraulic cylinders 205a, 205b respectively are positioned upon front end loader posterior 200b; they raise and lower front end loader 200 with fork lift attachment 203. The remaining third and fourth hydraulic cylinders 205c, 205d respectively pivot prior art retrofit adapter 206 on front end loader anterior 200a by hooks 92.

Referring to FIG. 12, retrofit adapter 206 fits within slots 46a upon bars 46b of prior art fork lift attachment 203; retrofit adapter 206 thereby connects fork lift attachment 203 to front end loader 200 (not seen in this view). Retrofit adapter 206 moves with hydraulic cylinders 205c, 205d whenever fork lift 203 is mounted to retrofit adapter 206, thereby pivoting fork lift attachment 203. This arrangement of retrofit adapter 206 with hydraulic cylinders 205c, 205d and fork lift attachment 203 allows the farmer to level seed drill 96 whenever modified seed drill 96 is attached to forks 202a, 202b.

Referring now to FIGS. 12A and 12B, to obtain the alignment described supra, the farmer manually lifts first fork 202a from its initial fork slot 223a within fork lift attachment 203. He then moves fork 202a to its furthest position from fork 202b, to second fork slot 223b. He also moves fork 202b from fork slot 223c to fork slot 223d until it is approximately 30 inches from fork 202a. Fork 202a slides to its fully opened 24 inch length, while second fork 202b opens only half-open twelve inches from fork lift attachment center 203a.

First fork 202a extends further than second fork 202b, because fork 202a slides adjacent to frame 149, and so it moves further than fork 202b from its original position. Each fork 202a, 202b moves approximately 24 inches for an approximately 48-inch horizontal interval with forks 202a, 202b fully open. Thirty inches is the horizontal interval necessary to fit tru-vee openers 150, 152, 153 and center frame 149 between forks 202a, 202b. Please see FIG. 13. The half open position of fork 202b is approximately (i) ten inches from fork lift center 203a, (ii) ten inches from the exterior edge 203b of fork lift attachment 203; and (iii) thirty-four inches from exterior edge 203c. These measurements take into account that forks 202a, 202b are each approximately four inches wide and approximately 1¼ inches thick.

Prior to mounting seed drill 96 to fork lift 203, fork 202a must slide alongside center frame 149 on seed drill side 96a. As seen in FIG. 15A one set 151 of tru-vee openers 150, 152, 153 respectively fits between forks 202a, 202b. The farmer then attaches forks 202a, 202b to opener draw bar 147 with first and second U-clamps 208a, 208b respectively, as best seen in FIG. 12A. Prior art unmodified seed drill 96 only deposits one row of soybean seeds 12 to the left and right of tractor center 97c. However, as seen in FIG. 15A, in my invention 110 there are four sets 151 of three tru-vee openers 150, 152, 153 on either side of center support frame 149. Now the farmer can attach modified seed drill 96 to forklift 203, so one tru-vee opener 152 is positioned directly anterior to tractor center 97c.

To mount seed drill 96 to fork lift 203, the farmers lifts hydraulic cylinder 205b, which is located beneath and at the posterior of front end loader 200. He then lifts front end loader 200 until each fork 202a, 202b moves under row cover unit frame 206. The farmer pivots hydraulic cylinder 205a (located upon and anterior to front end loader 200) to level forks 202a, 202b so forks 202a, 202b can slide between third frame 148 and opener drawer bar 147. Forks 202a, 202b must be completely level, otherwise forks 202a, 202b will not slide between third frame 148 and opener drawer bar 147.

The farmer next drives tractor 97 forward to further slide forks 202a, 202b under third frame 148 and upon opener draw bar 147. Fork 202a slides alongside center frame 149 on first seed drill side 96a while fork 202b slides alongside tru-vee opener 153 on second seed drill side 96b. One set 151 of three tru-vee openers 150, 152, 153 are now located between fork 202b and center support frame 149.

The farmer now places first and second ten inch U-clamp 208a, 208b respectively upon each fork 202a, 202b respectively, as well as upon opener draw bar 147. He then tightens U-clamp nuts 42 with first and second U-clamp steel plates 41a, 41b between U-clamp nuts 42 and opener draw bar 147. Using hydraulic lift 205b (located upon posterior 203b of fork lift attachment 203) the farmer lowers seed drill 96 to disperse soybean seeds 12. He elevates seed drill 96 at the end of a soybean area 9 or when otherwise transporting seed drill 96.

A John Deere 541 Series Loader 200 with attached fork lift 203 is the preferred front end loader and forklift of choice. However other front end loaders 200 and fork lifts 203 are satisfactory, depending upon compatibility with a farmer's equipment. As seen in FIG. 13, front end loader 200 pushes seed drill 96 while corn planter 95 follows behind tractor 97 and linearly deposits corn 10 within corn furrows 90. Referring to FIG. 14, in the best mode the farmer attaches corn planter 95 to tractor 97 posterior, using a three point hitch 230a or a one point tug hitch 230b, and both of which are familiar to the agricultural industry.

With a conventional front end loader 200 and a coupled conventional forklift 203, a farmer intercrops at least two plants simultaneously, thereby saving time, machine fuel and labor. In other modes modified seed drill 96 is towed by a first tractor 97, while a second tractor pulls attached corn planter 95 and closely follows the first tractor 97 with modified seed drill 96. Whether modified seed drill 96 or corn planter 95 proceeds the other is not crucial, if no significant time passes between corn and soybean seedings.

Attached Corn Planter 95

Referring to FIGS. 11 and 14, the farmer plants corn seeds 10 linearly within furrows 90 with a mechanical corn planter 95, which is preferably a KINZIE 3100 corn planter (not seen). Each corn planter 95 has row units 162 which open soil to create corresponding corn furrows 90. Each row unit 162 also places corn seed 10 within its corresponding corn furrow 90. As corn planter 95 moves forward, each corresponding row cover unit 162a covers its furrow 90 with soil 45.

Referring to FIG. 14, there are eight row units 162 (not all seen in this view) which horizontally align upon corn planter 95, and with corn planter 95 posteriorly attached to tractor 97. Each row unit 162 mechanically opens each furrow 90 and deposits corn seed 10a. Corn planter row units 162 are adjustable for linear intervals of seed deposit location, as well as seeding to a pre-determined depth. With my method 110, each row unit 162 deposits a corn seed 10a every eight linear inches, and row cover unit 162a then covers seeds 10 with soil 45.

After the farmer has intercropped and applied combination mulch 20 (described infra) to the first twenty-foot wide area of soil 45, he tills soil 45 and combination green manure 44 for an additional eight corn rows 8 (i.e., another approximate twenty feet lateral width) adjacent to the preceding intercropped twenty-foot wide area. This incremental process continues for each twenty-foot wide pass comprising eight consecutive furrows 90 which are separated by 30-inch corn row 8. In the best mode the operator uses a JOHN DEERE 520 seed drill 96 with a twenty-foot plant path width, and a corn planter 95 with an approximate twenty-foot pass width. However, if the operator uses a four row corn planter 95, he only tills that much soil 45 within four corn rows 8 of one pass.

Other means of intercropping commercial plants are also within the scope of my invention for larger commercial fields. For small gardens, the farmer uses a conventional manual leaf rake 99 to distribute soybean seed 12 randomly within each approximately twenty-inch wide soybean area 9. With either the manual method or mechanized approach, soybean seeds 12 are planted approximately two to three inches deep into soil 45.

Production and Application of Combination Mulch 20

Introduction

In the best mode mowed green manure plants 44a, corn stalks 5 and other organic debris 19 remaining after the fall harvest are collected similarly to conventional forage: A forage feed harvester harvests and blows mowed green manure plants 44a and debris 19 into forage box wagon 51. Please see FIGS. 18 and 20. In my invention 110, initial blending of combination mulch 20 results from mowing and blowing of severed green manure plants 44a and debris 19 into forage wagon 51.

Prior art bale chopper 108 chops organic debris 19 over soil 45, along with corn stalks 5, soybean stems and mowed green manure plants 44a (preferably upper portions of young wheat and buckwheat plants 18a) as combination mulch 20. Several seconds is the ideal maximum time interval between procedures for seeding and mulching during method 110. However, a time interval of no more than approximately two hours between seeding and mulching a twenty foot pass width is satisfactory.

Figure 17:
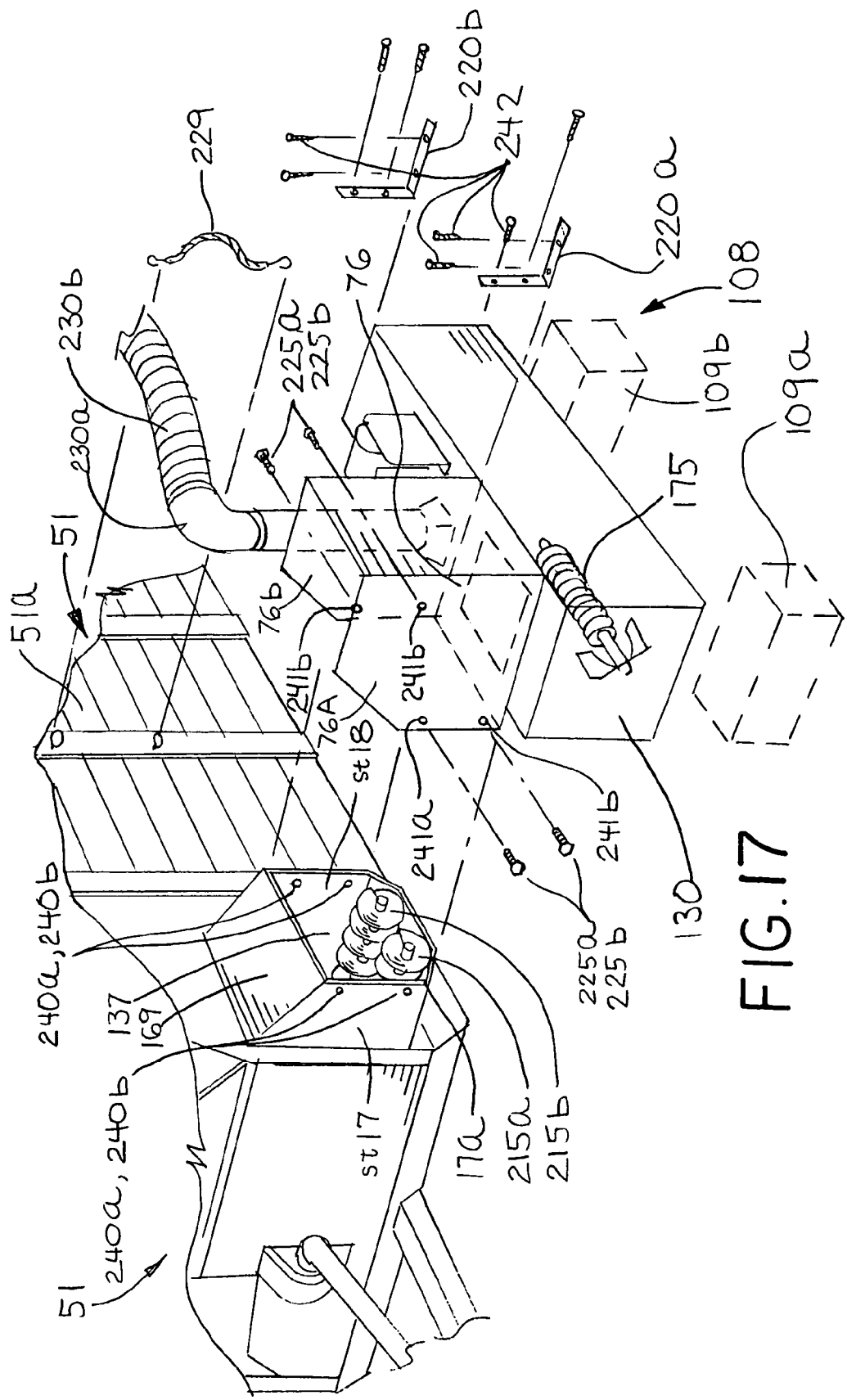
FIG. 17 illustrates a cutaway perspective view for assembly of a bale chopper and forage box wagon with attached exhaust hose.
Figure 19:
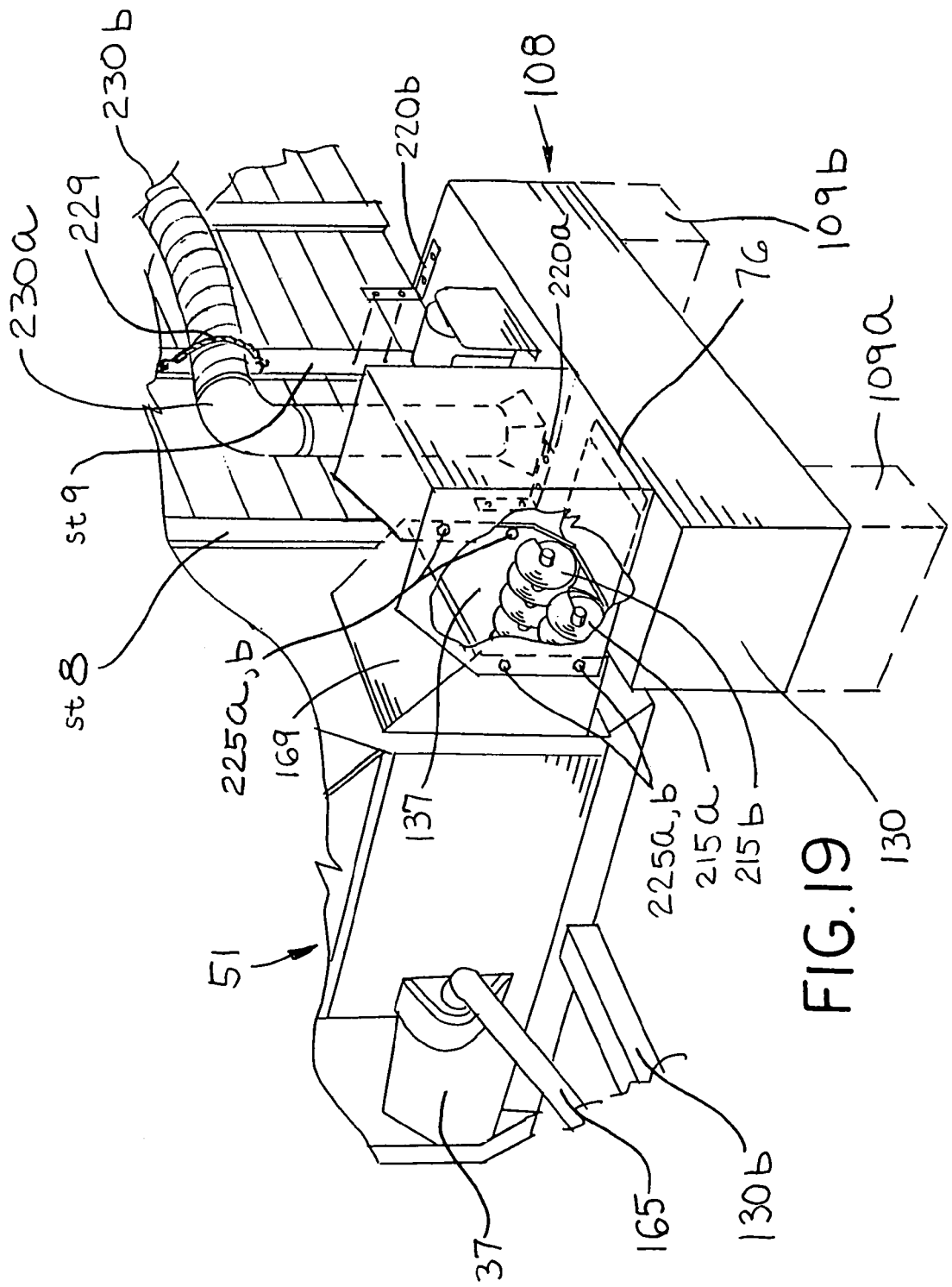
FIG. 19 illustrates a lateral cutaway view of the assembled forage box wagon and bale chopper of FIG. 17.

Referring now to FIGS. 17 and 19, the GOOSEN bale chopper is the preferred bale chopper 108, and it is available from:

Goosen Industries
P.O. Box 705
Beatrice, Nebr. 68310
1-800-228-6542;
1402-2284226

The preferred prior art forage box wagons 51 for temporarily storing large amounts of combined chopped mowed upper portions of young wheat and/or buckwheat plants 18a and organic debris 19 is available from:

H&S Manufacturing Co., Inc.
2608 South Hume Avenue
P.O. Box 768
Telephone: 1-715-387-3414
Marshfield, Wis. 54449
Models: HD7+4 & HD Twin Auger;
HD7+4 HDTwin Auger-front and rear unload; and
power box-rear unload For smaller amounts of upper portions of young wheat and/or buckwheat plants 18a and organic debris 19, preferred Versa Vac storage box wagons (conventionally used for grass clippings and leaf pick-up) are available from:

Fuerst Brothers, Inc.
P.O. Box 427
Gibson City, Ill.
1-800-435-9630,
Models: M180G, M500P, M500G, M900P, and M900G.

Fuerst Manure Spreaders are also satisfactory and are distributed by:

H.F.S. Tractor
1218 South 11th Street
Niles, Mich.
1-616-683-7272

Figure 16:
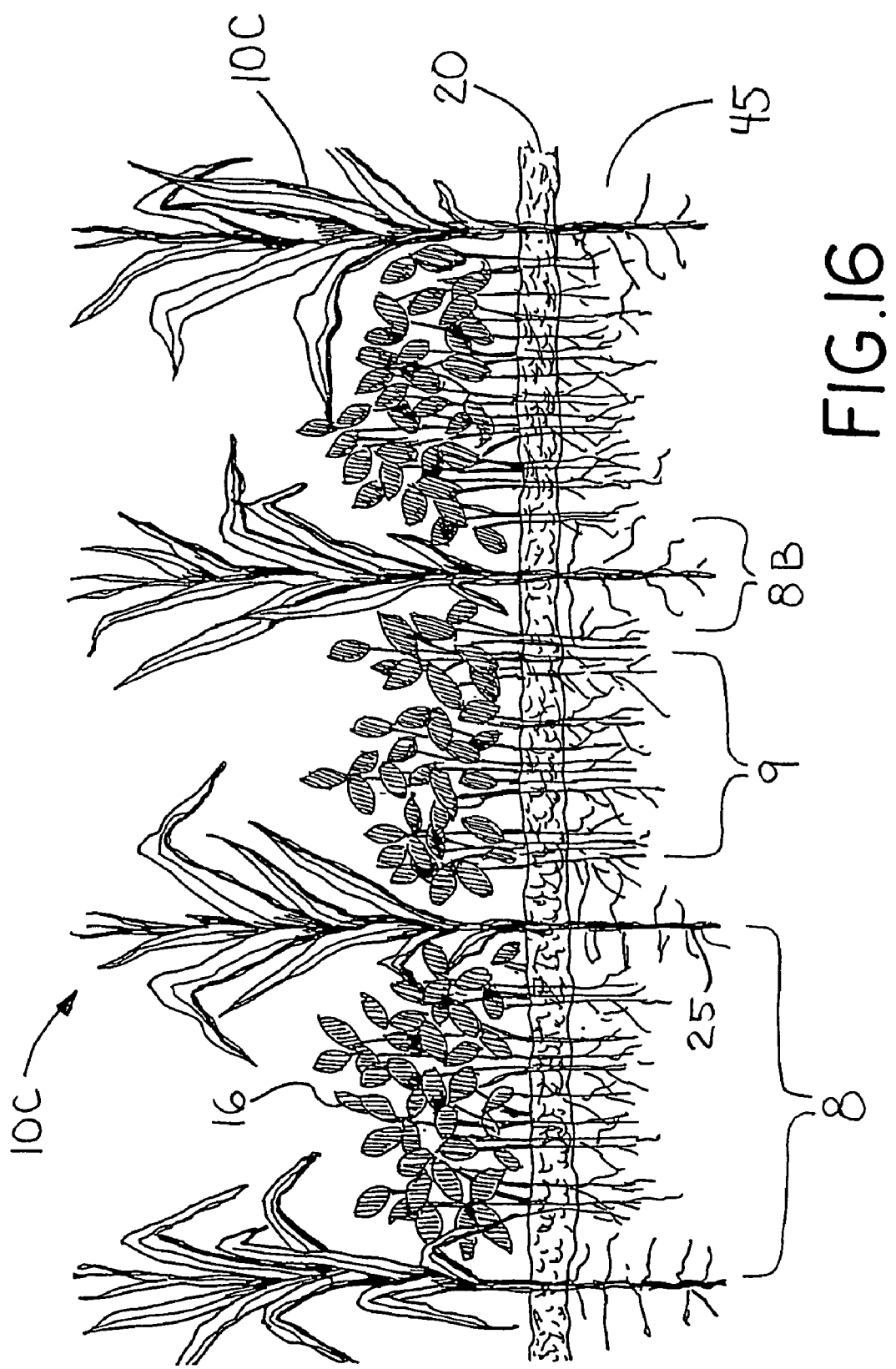
FIG. 16 illustrates combination mulch which covers the soil of intercropped maturing soybeans and corn.

Unload augers 215a, 215b and discharge opening 137 comprise a cover or lid in the prior art. Attachment of forage box wagons 51 to forage harvesters is already routine for harvest and storage of forage feed. However, my method 110 introduces a new manner to produce combined mulch 20 from green manure 44 and organic debris 19 in forage box wagon 51. In this process, the farmer operatively attaches bale chopper 108 to the side of forage box wagon 51 around first and second unload augers 215a, 215b respectively, infra. FIGS. 17 and 19. My method 110 eliminates manual labor for filling bale chopper 108 in the prior art. In addition, my remounted pipe 230a and hose 230b spray combination mulch 20 over the intercropped seeded field in a manner well known in this agricultural industry. Please see FIG. 16.

Mounting Bale Chopper 108 and Extension Hose 203 to Forage Box Wage 51

Prior to intercropping the farmer attaches preferred gasoline powered prior art bale chopper 108 to forage box wagon 51. First and second unload augers 215a, 215b respectively are located within discharge opening 137 along the anterior lateral exterior surface of forage box wagon 51. Please see FIGS. 17, 18. On either side of each first and second unload auger 215a, 215b are rear extension panel st17 and anterior extension panel st18 respectively. Power take off (PTO) 165 is a prior art drive shaft at tractor posterior 97e which connects to a second drive shaft on forage box wagon 51. When functionally connected, PTO 165 transfers power from tractor 97 to forage box wagon 51 to operate both unload augers 215a, 215b.

Figure 18:
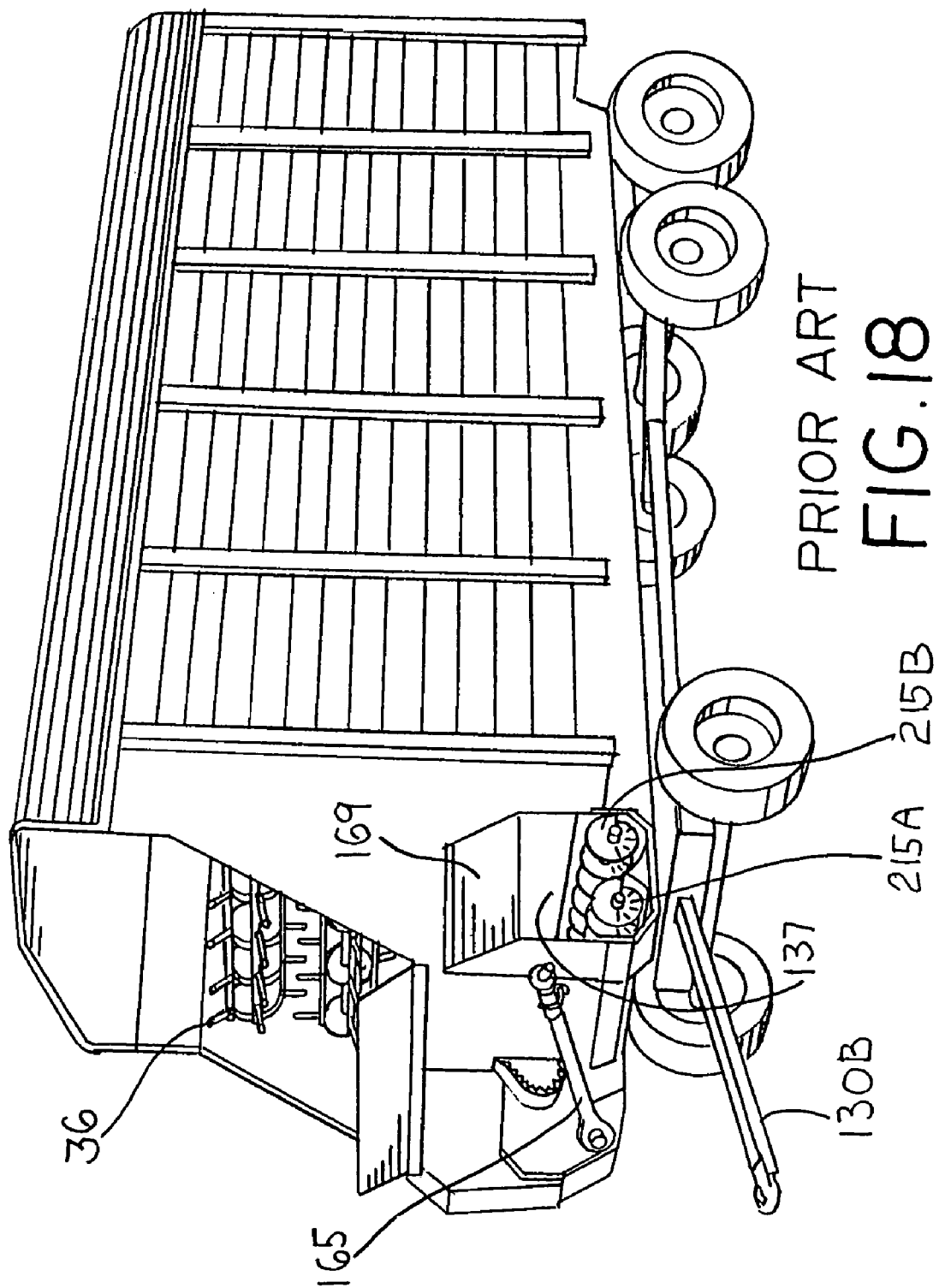
FIG. 18 illustrates a lateral view of a prior art forage box wagon with unload augers exposed.

In my invention 110, organic debris 19 and green manure plants 44a are pulled from prior art forage box wagon 51, through rotating augers 215a, 215b and beaters 36 located above augers 215a, 215b. FIG. 18. Using prior art t-rod slats attached to chains (not seen) on the floor of forage box wagon 51, green manure 44 is pulled to the forage wagon anterior. Rotating unload augers 215a, 215b propel organic debris 19 and green manure plants 44a through discharge opening 137 into bale chopper 108, while plastic guard 169 protects the farmer from injury during operation. FIG. 17.

Referring now to FIG. 17, unload augers 215a, 215b do not physically connect to bale chopper 108 in any manner. Instead, blended organic debris 19 and green manure plants 44a move through discharge opening 137 around augers 215a, 215b and then into bale tube 76, prior to entering bale chopper main frame 130. Bale tube 76 holds organic debris 19 and green manure plants 44a, until main frame knife blades 175a rotate and chop organic debris 19 and plants 44a, thereby creating combination mulch 20.

As best seen in FIG. 17, front and posterior panels st17, st18 respectively form first and second parallel walls of discharge opening 137. To attach bale chopper 108 to discharge opening 147, the farmer slides bale chopper 108 along panel st17, st18 exterior surfaces until interior surfaces of bale tube 76 snugly fit over exterior surfaces of panels st17, st18. The farmer next drills two ½ inch diameter circular apertures 240a, 240b (using a conventional power drill and a ½ inch drill bit) through anterior edges 17a, 18a of each corresponding extension panel st17, st18. Each pair of apertures 240a, 240b is located approximately four inches above the bottom of corresponding extension panel st17, st18. He also drills similar apertures 241a, 241b through both posterior edges 76a, 76b respectively of bale tube 76.

The farmer then places a first two-inch long by ½ inch thick auger bolt 225a through apertures 240a, 241a and an identical second auger bolt 225b through apertures 240b, 241b respectively. He then tightens auger bolts 225a, 225b in place with washers and nuts (not seen). In this manner, he attaches bale chopper 108 to each front and rear extension panel st18, rear st17 with first and second auger bolts 225a, 225b (i.e., two auger bolts 225 along each corresponding anterior edge 18a, 17a respectively of each front extension panel st18 and rear extension panel st17 respectively).

Figure 20:
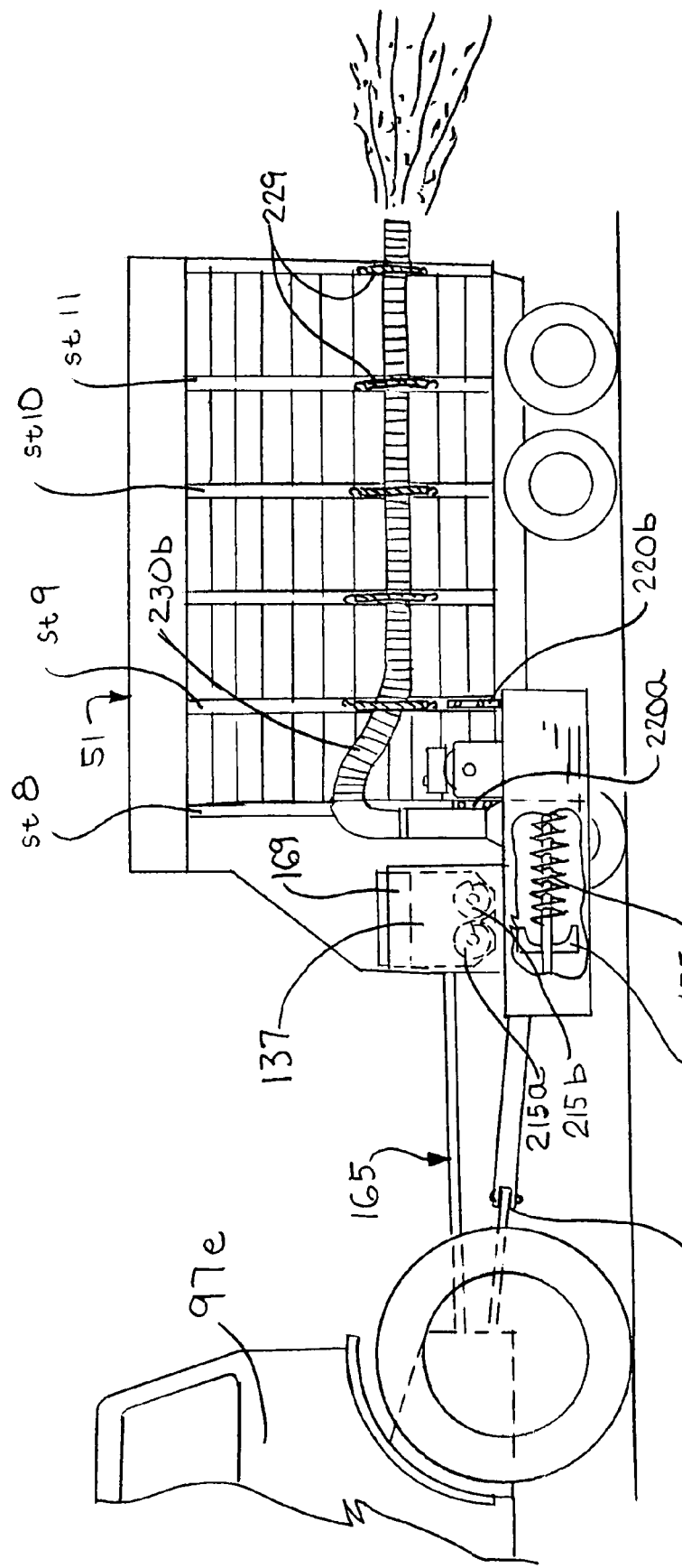
FIG. 20 illustrates a lateral view of the bale chopper and forage wagon with attached pipe, hose and bunge cords.

Still referring to FIGS. 17, 19 and 20, the farmer attaches one first and one second main frame L-bracket 220a, 220b respectively to first side stack st8 and second side stack st9 respectively. There are at least four self-taping screws 242 for attachment of each L-bracket 220a, 220b to side stack st8 and side stack st9. Each L-bracket 220a, 220b is preferably twelve-inches in length by one inch in width, and each self-taping screw 242 is approximately ⅜ inch wide by ½ inch-long.

L brackets 220a, 220b attach bale chopper main frame 130 to the side of forage box wagon 51.

As seen in FIGS. 17 and 19, the farmer must elevate bail chopper 108 so that bale tube 76 snugly encloses front and posterior panels st17, st18 prior to bolt 225a, 225b and L-bracket placement 220a, 220b. Because this bolt and bracket placement requires several hours, a platform for mounting bale chopper 108 is recommended. Preferably, the farmer places bale chopper 108 upon two wood blocks 109a, 109b until bale chopper 108 is attached by brackets 220a, 220b and bolts 225a, 225b to forage wagon 51.

Attachment of Hose 230b and Spray of Combination Mulch 20

Referring to FIGS. 19 and 20, the farmer uses four conventional bunge straps 229 to physically attach exhaust hose 230b, by hooking bunge straps 229 to first and second side stacks st7, st8 respectively, as well as third and fourth side stacks st10, st11 along forage box wagon 51. Pipe 230a connects bale chopper 108 to hose 230b in a manner well know in this art. Preferably hose 203b is trimmed to spray combination mulch 20 over soil 45.

In smaller fields or gardens, implements such as the 109 BLUEBIRD™ EasyRake are recommended to collect and distribute a smaller quantity of combination mulch 20 over soil 45. The farmer manually plants and seeds soil 45 within an area of approximately ten to 20 feet in width. The farmer can then follow seeding with application of combination mulch 20 in the smaller field or garden.

The BLUEBIRD™ EasyRake is available from:
BlueBird International, Inc.
1400 East 66th Avenue
Denver, Colo. 80229 U.S.A.
Phone: 1-303-288-5880; 1-800-808-BIRD Timetable and Schedule for Planting The best mode and preferred embodiment for the spring planting schedule for my combined intercropping and mulching method 110 is as follows:

(a) During early May, the planter checks soil 45 to ensure a minimum soil temperature of 60 degrees F. Also at this time, the planter checks soil nutrients, by using a soil test kit well known in the industry. Such a kit is Rapitest Soil Test Kit No. 1601, which is available from:
Luster Leaf Products, Inc.
2220 Techcourt
Woodstock Ill. 60098
Phone: 1-800-327-5567

(b) Also early in May of the same growing season, green manure plants 44a and organic crop debris 19 are mowed and raked. One portion of combined green manure 44 (i.e, green manure plants and organic crop debris 19) is briefly stored for combination mulch 20, as described supra. In the best mode upper portions of young wheat and/or buckwheat plants 18a comprising green manure 44 are cut approximately three to ten inches above soil 45.

(i) approximately one/half of combination green manure 44 and organic residue 19 is tilled approximately four inches into soil 45.

(ii) the farmer then tills soil 45 and organic residue 19 to a depth of approximately nine to 14 inches in large commercial fields and approximately four to nine inches in depth in a garden. He then immediately seeds corn 10 and soybeans 12, covers them with soil 45, and lastly covers the soil with combination mulch 20 to approximately ½ inch in depth.

(i) approximately one/half of combination green manure 44 and organic residue 19 is tilled approximately four inches into soil 45.

(ii) the farmer then tills soil 45 and organic residue 19 to a depth of approximately nine to 14 inches in large commercial fields and approximately four to nine inches in depth in a garden. He then immediately seeds corn 10 and soybeans 12, covers them with soil 45, and lastly covers the soil with combination mulch 20 to approximately ½ inch in depth.

Combination mulch 20 diminishes soil heat loss and also absorbs solar warmth at this point in the growing cycle when the air temperature is still cool. There is also heat created by bacterial and fungal decomposition of combined green manure 44 within soil 45, as well as diminished sun-bleached soil.

(c) First week after seeding and mulching: Corn seedlings 10b and soybean seedlings 14 sprout, due to increase in moisture and heat from combination mulch 20. There is also solar heat from combination mulch 20 and retention of moist heat from above surface combination mulch 20.

(d) Second week after seeding: Corn seedlings 10b and soybean seedlings 14 compete for space and create a leaf canopy 30. Nitrogen fixing soybean root nodules 18 first appear.

(e) Third week after seeding: Maturing corn plants 10c are approximately 14 inches in height. Soybean corn leaf canopy 30 begins to shade soil 45, thus discouraging sprouting weeds 62. Most soybean root nodules 18 now are clearly visible.

(g) Fourth week after seeding: Maturing corn plants 10c are now approximately 30 inches in height and maturing soybean plants 16 are approximately 23 inches in height. Weeds 62 continue to weaken from light deprivation. Soybean and corn plants 10c, 16 respectively quickly fill space with available sunlight.

(h) Sixth week after seeding: Corn roots 25 now physically contact soybean roots 17. Corn plants 10c turn from a glossy light green to a darker green color, while corn roots 25 continue to elongate and contact soybean roots 17. Soybean pods 18 appear in approximately mid-July.

(i) Seventh week after seeding: Corn roots 25 continue to elongate towards soybean roots 17. Both soybean roots 17 and corn roots 25 intertwine to form a physically massive root system 25a. Meanwhile, leaf canopy 30 assists in retention of moisture within soil 45. Leaf canopy 30 also prevents the sun from cracking and bleaching topsoil 45a.

(j) Eighth week after seeding: Sporadic weeds 62 grow through corn and soybean leaf canopy 30. However, they generally remain stunted and close to topsoil 45a. Surviving smartweed diminishes Japanese beetle consumption of maturing soybean plants 16 and maturing corn plants 10c.

Planted in the above manner and according to the above timetable/schedule, maturing corn plants 10c and soybean plants 16 more effectively resist near-drought conditions with a topsoil temperature of approximately 80 degrees (Fahrenheit) F. Intertwining root system 25a retains moisture by reducing evaporation and erosion.

Unlike my mulch treated intercropped topsoil 45a, topsoil of conventional single crop fields generally acquires an approximate ⅛ inch sun bleached crust during summer months. Moreover, conventional single crop fields remain desiccated from approximately one to three inches into soil 45 by August during typically dry midwestern summers. In fact, summer soil temperatures in these single crop fields routinely reach a temperature of at least approximately 100 degrees F.

My intertwining root system 25a, even after an early frost, remains physically intact and retains soil and nutrients during winter months. Intertwining root system 25a also resists erosion from wind, snow and rain, thereby preventing soil losses of bare conventional winter fields. Hundreds of corn roots 25 and soybean roots 25 demonstrate intertwining root systems 25a, and reveal more roots 25 on the side of corn plants 10c which are physically closest to soybean plants 16. Moreover, corn plant roots 25 are longer on sides closest to soybean plants 16. Corn plant roots 25 also quickly attach to organic debris 19 tilled into soil.

Windbreaking and Microclimate 31

Each intercropped corn row 8 comprising linearly aligned corn plants 5 exhibits a windbreaking effect on shorter proximate soybean plants 16 (from approximately the first two feet of maturing soybean plant 16 height). Each intercropped row/area 9 of soybean plants 16 also has its own windbreaking effect on lower cornstalks 5. All these windbreaking effects prevent wind from desiccating and blowing topsoil 45a.

Examples of conventional windbreaks include a fence of appropriate height and permeability, as well as treelines. These windbreaks should be approximately 50 percent permeable and have a windbreaking effect up to six times the height of the particular plant. A permeable fence allows at least 50% of prevailing wind to pass through of its structure, and consequently it slows and does not stop the wind. My combined intercropping and mulching process 101 differs from artificial windbreaks, because each corn row 8 is itself an effective windbreak feature. In fact, each linear arrangement of corn within its corn row 8 exhibits a windbreaking effect on crops of approximately six times the height of an average corn plant 10c. However, corn plants 10c must be planted linearly as in corn rows 8, and they must be intercropped with plants such as soybeans 16 or buckwheat 18.

Moisture Retention

Corn leaves 19 are physically shaped as moisture collectors, as are soybean leaves 26. Corn leaves 19 collect water drops which flow to lower soybean leaves. Or, moisture such as rain or dew collecting within corn leaves 19 gutters to leaf pockets and then directly to topsoil 45. Soybean leaves 26 recollect water dropped from corn leaves 19 and gutter to topsoil 45a in a similar manner. This moisture collection aids artificial irrigation by forming tiny streams which drain directly to the soil lying beneath leaf canopy 20. This process occurs shortly after soybean seeds 12 and corn seeds 10 sprout approximately two weeks after seeding. By the third week after seeding (planting), there is a full effect before the summer growing, when water generally becomes more scarce, particular in treeless fields.

Microclimate 31 of my combined intercropping and mulching process 110 also creates, between topsoil 45a and leaf canopy 30, a zone of diminished air movement and low light intensity. Artificial fertilizers are unnecessary in this best mode and preferred embodiment of my combined mulching and intercropping process 110. However, in other embodiments the planter can apply fertilizer uniformly throughout the soil to a depth of approximately eight inches, in a concentric manner around each row 8, 9 of plants 10c, 16.

Harvesting the Commercial Crop

Mature soybean pods 20 are harvested during October or November, which is after corn ears are harvested, and the soybean pods 20 attain sufficient moisture. Subsequently, corn ears continue to dry in the field. In late October or early November, corn ears are harvested by a conventional combine, which is well known in the agricultural industry.

As seen supra, my improved combined intercropping and mulch process 110 allows corn harvests with different crop combinations. However the drying times of different crop species varies, as does crop and weather moisture content between growing seasons. Therefore, the planter should make an individualized decision each year, as to exactly when to harvest the commercial corn and soybean crops. Such re-evaluation diminishes losses from leaving crops in the field an overly long time.

My improved intercropping and mulching method 110 seeds at least two commercial crops simultaneously. The time interval for maturation of both corn 10a and soybeans 12 is approximately one hundred days. My generic method requires that soil 45 be tilled evenly and blended with combined green manure 44. In addition, legumes are a requirement for all my intercropped fields as at least one commercial crop.

The invention claimed is:

1. An improved intercropping and mulching method without artificial herbicides, fertilizer, pesticides and manure, said improved intercropping and mulching method comprising:
    (1) no-till planting an annual green manure crop in the soil of a predetermined area;
    (2) mowing said annual green manure crop the following spring, said annual green manure crop being combined with organic residue from said predetermined area to form combined green manure, said organic residue comprising desiccated intact soybean roots and desiccated intact nitrogen nodules, said combined green manure comprising a first portion of said combined green manure and a second portion of said combined green manure, said second portion of said combined green manure further blended with said soil of said predetermined area to a depth of approximately nine to fourteen inches, said annual green manure crop remaining unmowed until tillage of said soil,
    (3) intercropping at least two commercial crops within said soil blended with said second portion of said combined green manure, said first portion of said combined green manure being collected, chopped and stored until intercropping is complete, said first portion of said combined green manure becoming said combination mulch after said chopping,
    (4) thereafter spraying said first portion of said combination mulch upon the surface of said soil of said predetermined area, said predetermined area now containing seeds of said at least two commercial crops,
    whereby said combined green manure provides nutrients to said at least two commercial crops and said combination mulch provides a ground cover and nutrients for said at least two commercial crops, said annual green manure crop and said organic residue protecting said soil of said predetermined area during the winter.

2. The improved intercropping and mulching method as described in claim 1, wherein one of said at least two commercial crops comprises a legume.

3. The improved intercropping and mulching method as described in claim 1, wherein one of said at least two commercial crops comprises soybeans.

4. The improved intercropping and mulching method of claim 1 wherein one of said at least two commercial crops comprises corn.

5. The improved intercropping and mulching method of claim 1 wherein one of said at least two commercial crops comprises corn and one of said at least two commercial crops comprises soybeans.

6. The improved intercropping and mulching method as described in claim 1, wherein there are no intercropped plants other than said at least two commercial crops, said at least two commercial crops comprising said corn and said soybeans.

7. The improved intercropping and mulching method as described in claim 6 wherein said corn and said soybeans are planted in alternating patterns comprising soybean areas and corn rows, each said soybean area and said corn row comprising a predetermined lateral width.

8. The improved intercropping and mulching method as described in claim 7, wherein said annual green manure crop comprises buckwheat.

9. An improved intercropping and mulching method comprising:
    (1) planting an annual green manure crop in the soil of a predetermined area;
    (2) mowing said annual green manure crop the following spring, said annual green manure crop being combined with organic residue to form combined green manure, said combined green manure comprising a first portion of said combined green manure and a second portion of said combined green manure, said second portion of said combined green manure further blended with said soil of said predetermined area, said first portion of said combined green manure being mechanically collected and mechanically chopped and thereby becoming a combination mulch, (3) intercropping at least two commercial crops within said soil blended with said second portion of said combined green manure, said combination mulch being stored during said intercropping, (4) thereafter spraying said first portion of said combination mulch upon said soil of said predetermined area, said predetermined area now containing seeds of said at least two commercial crops, whereby said combined green manure provides nutrients to said at least two commercial crops and said combination mulch provides a ground cover and nutrients for said at least two commercial crops, said annual green manure crop and said organic residue protecting said soil of said predetermined area during the winter, one of said at least two commercial crops comprising a legume, One of said two commercial crops further comprising soybeans, one of said at least two commercial crops comprising corn, said at least two commercial crops comprising corn and soybeans, there being no intercropped plants other than said at least two commercial crops comprising corn and soybeans, Said corn and said soybeans planted in alternating patterns comprising corn rows and soybean areas respectively, each said soybean area and said corn row comprising a predetermined lateral width, said annual green manure crop selected from the group consisting of wheat, Austrian peas, hairy vetch, soybeans, annual rye grass and winter rye.

10. The improved intercropping and mulching method as described in claim 9, wherein said annual green manure crops are mowed with a conventional mechanical forage harvester.

11. The improved intercropping and mulching method as described in claim 10, wherein said combination mulch is sprayed upon said soil of said predetermined area after blending and chopping of said green manure plants and organic debris within a bale chopper.

12. The improved intercropping and mulching method as described in claim 11 wherein said intercropped soybeans are planted simultaneously with said intercropped corn by using a fork lift attachment with two forks, front end loader and tractor, corn planter, and a modified seed drill, said modified seed drill and said fork lift attaching to said tractor by said front end loader, said fork lift attachment elevated with a hydraulic lift and a retrofit adapter.

13. The improved intercropping and mulching method as described in claim 12 wherein said corn planter deposits said corn seeds between previously planted said soybean areas, said soybean areas consisting of soybean subrows, said soybean subrows deposited by said modified seed drill attached to a tractor, said corn seeds deposited within straight corn furrows.

14. An improved intercropping and mulching method for corn and soybeans comprising:

(A) planting a commercial legume crop in the soil of a predetermined area during the summer, said commercial legume crop forming organic debris within said soil after harvesting of said commercial legume crop, (B) no-till planting buckwheat and wheat during the following fall in said soil of said predetermined area, said buckwheat and said wheat growing until the following spring, said buckwheat and said wheat covering said soil during the winter, (C) mowing said buckwheat and said wheat during said following spring, said mowing accomplished by forage harvester, a second portion of said buckwheat and wheat forming an annual green manure for said soil of said predetermined area, said organic debris also comprising said second portion, a first portion of said buckwheat and said wheat forming a combination mulch for said soil, said combination mulch further comprising said organic debris, said first portion being mechanically collected and chopped prior to becoming said combination mulch, said combination mulch being stored in a forage box wagon, (D) creating consecutive corn rows, each said corn row comprising three subrows of soybean seeds within a soybean area, each said corn row further comprising one corn furrow, (E) seeding said soybean seeds in alternating said soybean areas within said consecutive corn rows by using a modified seed drill and a fork lift with a front end loader and a tractor, said tractor comprising a tractor center, said modified seed drill comprising sets of three tru-vee openers along a horizontal opener draw bar, said fork lift rigidly attached to said modified seed drill by a first fork and second fork, said forks attaching to said modified seed drill by enclosing one set of said tru-vee openers, said modified seed drill aligned with said tractor so said soybean seeds deposit directly beneath and anterior to said tractor center, (F) seeding said corn seed with a corn planter attached posterior to said tractor, said corn planter creating said corn furrows within said soil corn, said corn furrows containing linearly deposited said corn seeds, said corn furrows spaced laterally from each other approximately 30 inches, said soybean subrows located approximately midway between two consecutive said corn furrows, (G) covering said seeded soil with said combination mulch, said first portion of said green manure plants and organic debris placed within a forage box wagon prior to chopping within said bale chopper to form said combination mulch, said combination mulch sprayed onto said soil of said predetermined area with a hose attached to a bale chopper mounted to said forage box wagon.

15. The method described in claim 7 wherein soybean seeds are planted at approximately eight to twenty seeds per square foot of said soil and corn seeds are planted at approximately one corn seed per eight linear inches of said soil, said soybean seeds planted during the same pass across said preselected soil as said corn seeds.

16. The method described in claim 7 wherein a modified seed drill comprises eight sets of tru-vee openers and one center bar, a single said set of said tru-vee openers fitting between first and second forks, said single set of tru-vee openers positioned immediately proximal to either side of said center bar, each said first and second fork resting upon an opener draw bar on either side of said single said set of said tru-vee openers, each said first and second fork attached to said opener draw bar by a clamp.

17. The method described in claim 7 wherein three soybean subrows comprising a soybean area are approximately 21 inches in total lateral width.

18. The method as described in claim 7 wherein rotating augers pull said organic debris and said green manure plants from said forage box wagon into a bale chopper, said bale chopper attaching to a discharge opening by sliding said bale chopper until interior surfaces of a bale tube fit snugly over exterior surfaces of panels of an attached forage box wagon.

19. The method as described in claim 16 wherein said true-vee openers are arranged in said sets of three, thereby leaving lateral space between each said set along said horizontal bar, each said set seeding soybeans within said three said soybean subrows when said modified seed drill is pulled by a tractor, each said lateral space resulting in unseeded soil, said unseeded soil then seeded with said corn seed within said corn furrows while said corn planter is pulled by said tractor, said seeding of said corn seed and said soybean seed occurring with said modified seed drill and corn planter operatively attached to said tractor.

20. The method as described in claim 19 wherein said two sides of a bale tube attach to said bale chopper, said two sides of said bale tube snugly fitting over an anterior and posterior panel, said anterior and posterior panels surrounding said augers of said forage box wagon, said sides of said bale tube mechanically attached to said anterior and posterior panels, said forage box wagon physically attaching to a bale chopper main frame with L-brackets, said green manure plants and organic debris chopped within said bale chopper main frame after passing said augers.

* * * * *